(12) United States Patent
Yokoyama et al.

(10) Patent No.: US 10,976,821 B2
(45) Date of Patent: Apr. 13, 2021

(54) INFORMATION PROCESSING DEVICE, INFORMATION PROCESSING METHOD, AND PROGRAM FOR CONTROLLING OUTPUT OF A TACTILE STIMULUS TO A PLURALITY OF TACTILE STIMULUS UNITS

(71) Applicant: SONY CORPORATION, Tokyo (JP)

(72) Inventors: Ryo Yokoyama, Tokyo (JP); Ikuo Yamano, Tokyo (JP); Yusuke Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 16/302,187

(22) PCT Filed: Apr. 6, 2017

(86) PCT No.: PCT/JP2017/014379
§ 371 (c)(1),
(2) Date: Nov. 16, 2018

(87) PCT Pub. No.: WO2018/008217
PCT Pub. Date: Jan. 11, 2018

(65) Prior Publication Data
US 2019/0196596 A1 Jun. 27, 2019

(30) Foreign Application Priority Data
Jul. 7, 2016 (JP) .............................. JP2016-134717

(51) Int. Cl.
*G06F 3/01* (2006.01)
*A63F 13/285* (2014.01)
(Continued)

(52) U.S. Cl.
CPC .............. *G06F 3/016* (2013.01); *A63F 13/25* (2014.09); *A63F 13/285* (2014.09); *G06F 3/01* (2013.01); *G06F 3/0346* (2013.01)

(58) Field of Classification Search
CPC .......... A63F 13/25; A63F 13/285; G06F 3/01; G06F 3/016; G06F 3/0346
See application file for complete search history.

(56) References Cited

U.S. PATENT DOCUMENTS 10,488,928 B2 * 11/2019 Katsuki .................... G06F 3/016
2011/0267294 A1 * 11/2011 Kildal .................... G06F 3/0414
345/173

(Continued)

FOREIGN PATENT DOCUMENTS

| JP | 2007-048268 A | 2/2007 |
| JP | 2009-070263 A | 4/2009 |
| JP | 2015-166890 A | 9/2015 |

*Primary Examiner* — Chun-Nan Lin
(74) *Attorney, Agent, or Firm* — Paratus Law Group, PLLC

(57) ABSTRACT

There is provided an information processing device, an information processing method, and a program capable of changing an output of a tactile stimulus adaptively to positional information, the information processing device including: an output control unit configured to control output of a tactile stimulus to at least two tactile stimulus units. The output control unit changes the output of the tactile stimulus unit corresponding to predetermined positional information in accordance with the predetermined positional information and information regarding tactile output related to the positional information.

21 Claims, 25 Drawing Sheets

(51) Int. Cl.
 *A63F 13/25* (2014.01)
 *G06F 3/0346* (2013.01)

(56) References Cited

U.S. PATENT DOCUMENTS

| | | | | |
|---|---|---|---|---|
| 2012/0105438 | A1* | 5/2012 | Huang | A63F 13/10 |
| | | | | 345/419 |
| 2015/0130707 | A1* | 5/2015 | Da Costa | G06F 3/016 |
| | | | | 345/156 |
| 2015/0248161 | A1* | 9/2015 | Komori | G06F 3/016 |
| | | | | 345/157 |
| 2018/0348868 | A1* | 12/2018 | Lee | G06F 3/011 |
| 2018/0356907 | A1* | 12/2018 | Parazynski | A61B 34/70 |

* cited by examiner

PERCEPTUAL POSITION

INFORMATION PROCESSING DEVICE, INFORMATION PROCESSING METHOD, AND PROGRAM FOR CONTROLLING OUTPUT OF A TACTILE STIMULUS TO A PLURALITY OF TACTILE STIMULUS UNITS

CROSS REFERENCE TO PRIOR APPLICATION

This application is a National Stage patent application of PCT International Patent Application No. PCT/JP2017/014379 (filed on Apr. 6, 2017) under 35 U.S.C. § 371, which claims priority to Japanese Patent Application No. 2016-134717 (filed on Jul. 7, 2016), which are all hereby incorporated by reference in their entirety.

TECHNICAL FIELD

The present disclosure relates to an information processing device, an information processing method, and a program.

BACKGROUND ART

In the related art, for example, various technologies for presenting tactile stimuli such as vibration to users have been proposed.

For example, Patent Literature 1 discloses a technology for outputting a tactile stimulus to a predetermined device in a case in which an event occurs in a virtual space.

CITATION LIST

Patent Literature

Patent Literature 1: JP 2015-166890A

DISCLOSURE OF INVENTION

Technical Problem

Incidentally, for example, a tactile stimulus to be output preferably differs depending on a position or the like which is a tactile stimulus target. However, in the technology disclosed in Patent Literature 1, the same tactile stimulus is output regardless of positional information.

Accordingly, the present disclosure proposes a novel and improved information processing device, a novel and improved information processing method, and a novel and improved program capable of changing an output of a tactile stimulus adaptively to positional information.

Solution to Problem

According to the present disclosure, there is provided an information processing device including: an output control unit configured to control output of a tactile stimulus to at least two tactile stimulus units. The output control unit changes the output of the tactile stimulus unit corresponding to predetermined positional information in accordance with the predetermined positional information and information regarding tactile output related to the positional information.

In addition, according to the present disclosure, there is provided an information processing method including: controlling output of a tactile stimulus to at least two tactile stimulus units; and changing, by a processor, the output of the tactile stimulus unit corresponding to predetermined positional information in accordance with the predetermined positional information and information regarding tactile output related to the positional information.

In addition, according to the present disclosure, there is provided a program causing a computer to function as: an output control unit configured to control output of a tactile stimulus to at least two tactile stimulus units. The output control unit changes the output of the tactile stimulus unit corresponding to predetermined positional information in accordance with the predetermined positional information and information regarding tactile output related to the positional information.

Advantageous Effects of Invention

According to the present disclosure, as described above, it is possible to change an output of a tactile stimulus adaptively to positional information. Further, the effect described here is not necessarily limiting, and any effect described in the present disclosure may be included.

MODE(S) FOR CARRYING OUT THE INVENTION

Figure 1:
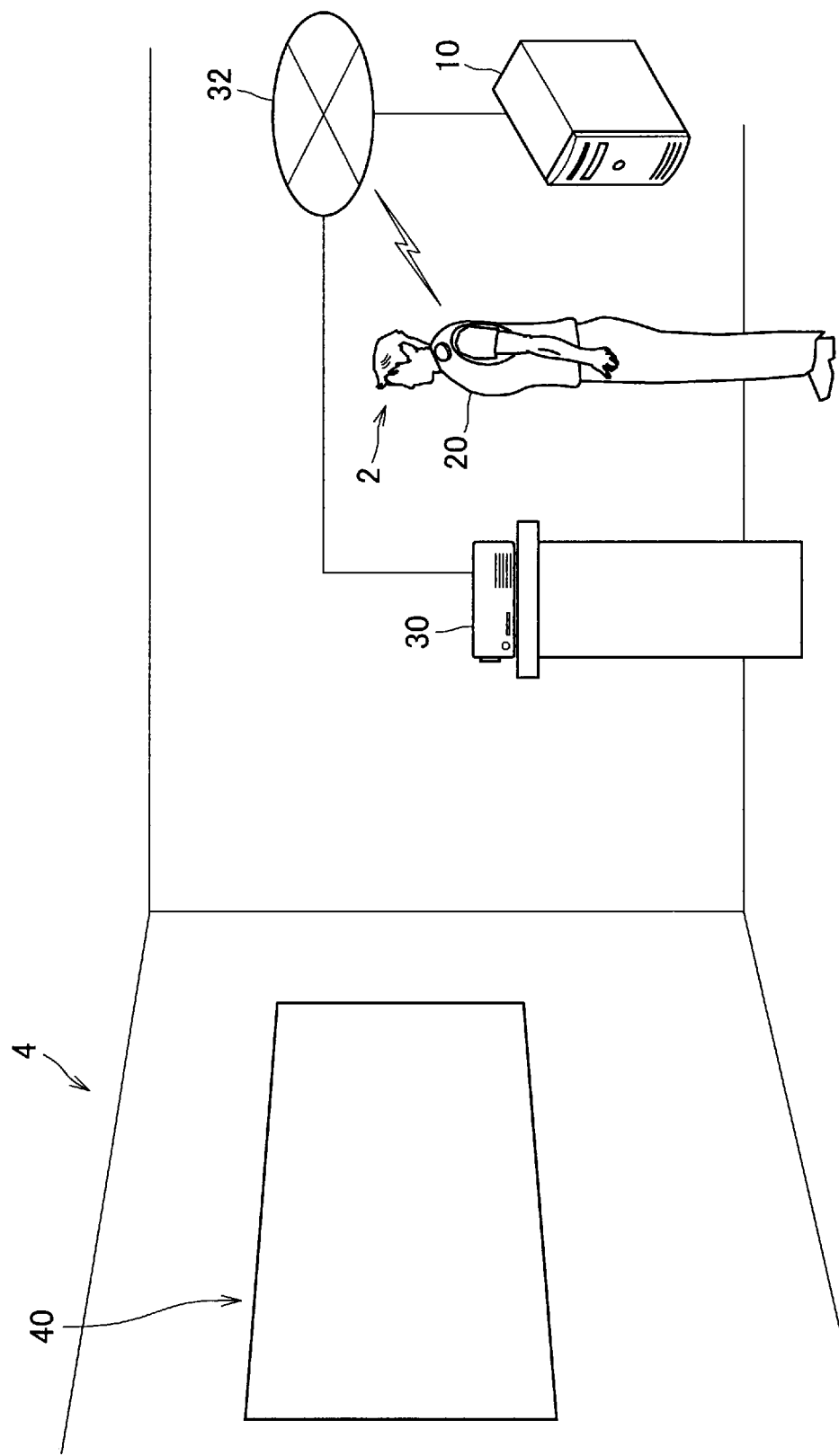
FIG. 1 is an explanatory diagram illustrating a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are also distinguished by attaching different letters after the same reference numerals. For example, a plurality of components having substantially the same functional configuration are distinguished like a server 10a and a server 10b if necessary. Here, in a case in which it is not necessary to particularly distinguish each of a plurality of constituent elements having substantially the same functional configuration, only the same reference numerals are attached. For example, in a case in which it is not necessary to particularly distinguish the server 10a and the server 10b from each other, they are simply referred to as a server 10.

In addition, the items of "Mode(s) for Carrying Out the Invention" will be described in the following order.
1. Configuration of information processing system
2. Detailed description of embodiment
3. Application examples
4. Hardware configuration
5. Modification example

1. Configuration of Information Processing System

First, a configuration of an information processing system according to an embodiment of the present disclosure will be described with reference to FIG. 1. FIG. 1 is an explanatory diagram illustrating the configuration of the information processing system according to the embodiment. As illustrated in FIG. 1, the information processing system includes a server 10, a display device 30, and a communication network 32. In addition, in the embodiment, as illustrated in FIG. 1, a user 2 can wear a jacket 20 to be described below.

1-1. Jacket 20

Figure 2:
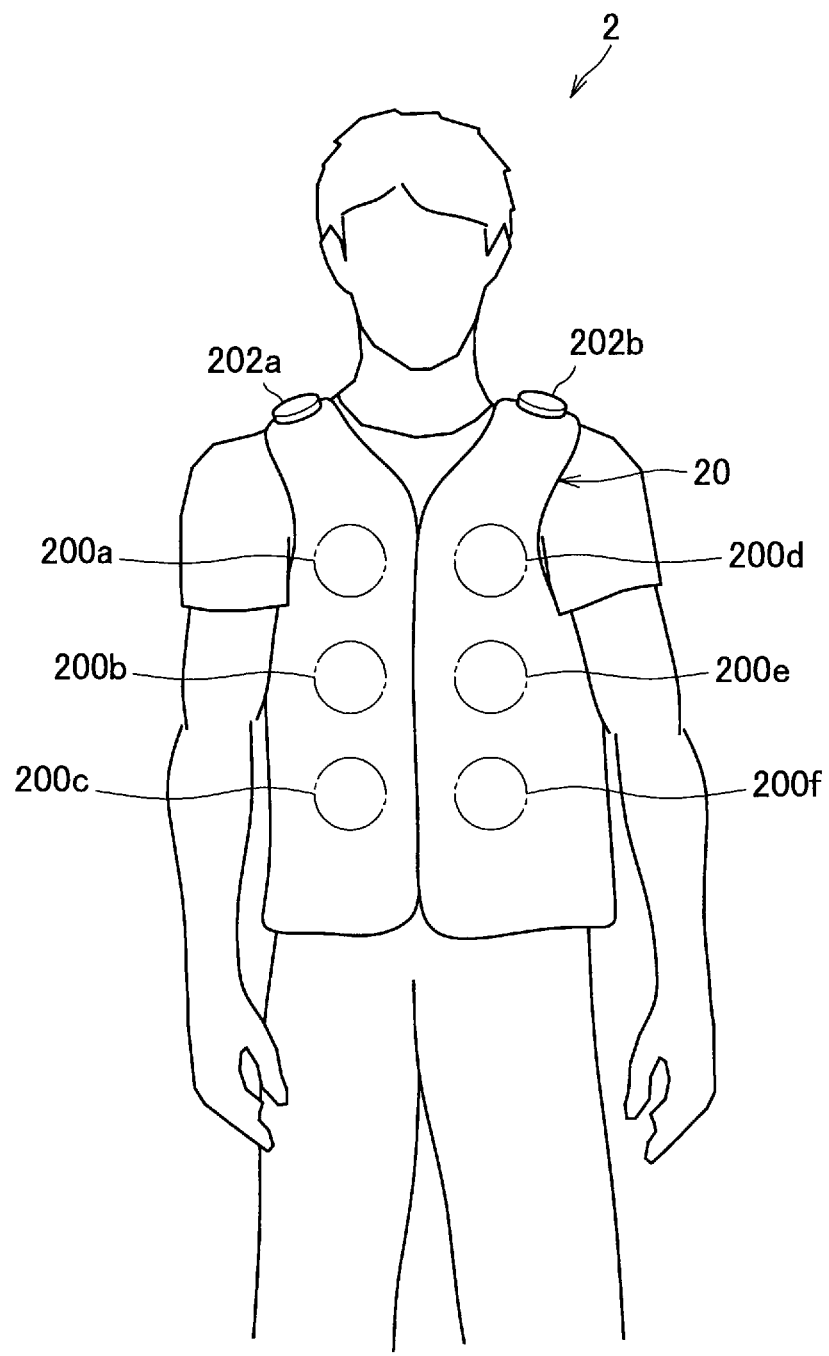
FIG. 2 is an exterior view illustrating a jacket 20 according to the embodiment.

FIG. 2 is a diagram illustrating the exterior of the jacket 20. As illustrated in FIG. 2, the jacket 20 includes a plurality of tactile stimulus units 200 and two sound output units 202 inside the jacket 20. For example, inside the jacket 20, a predetermined number of (for example, 6) tactile stimulus units 200 can be disposed on each of the front side and the rear side of the user. For example, the individual tactile stimulus units 200 are disposed in a positional relation in which the individual tactile stimulus units 200 disposed on the front side mutually face the individual tactile stimulus units 200 disposed on the rear side. Note that, although FIG. 2 illustrates an example in which the jacket 20 is a sleeveless article, the present disclosure is not limited to this example and the jacket 20 may have sleeves. In this case, one or more tactile stimulus units 200 can also be disposed at positions corresponding to both arms of the user as well as the abdomen and the chest of the user.

1-1-1 Tactile Stimulus Units 200

Each tactile stimulus unit 200 outputs, for example, a tactile stimulus such as vibration in accordance with, for example, a control signal received from the server 10. Note that an example in which each tactile stimulus unit 200 generates vibration as a tactile stimulus will be mainly described below.

Figure 3:
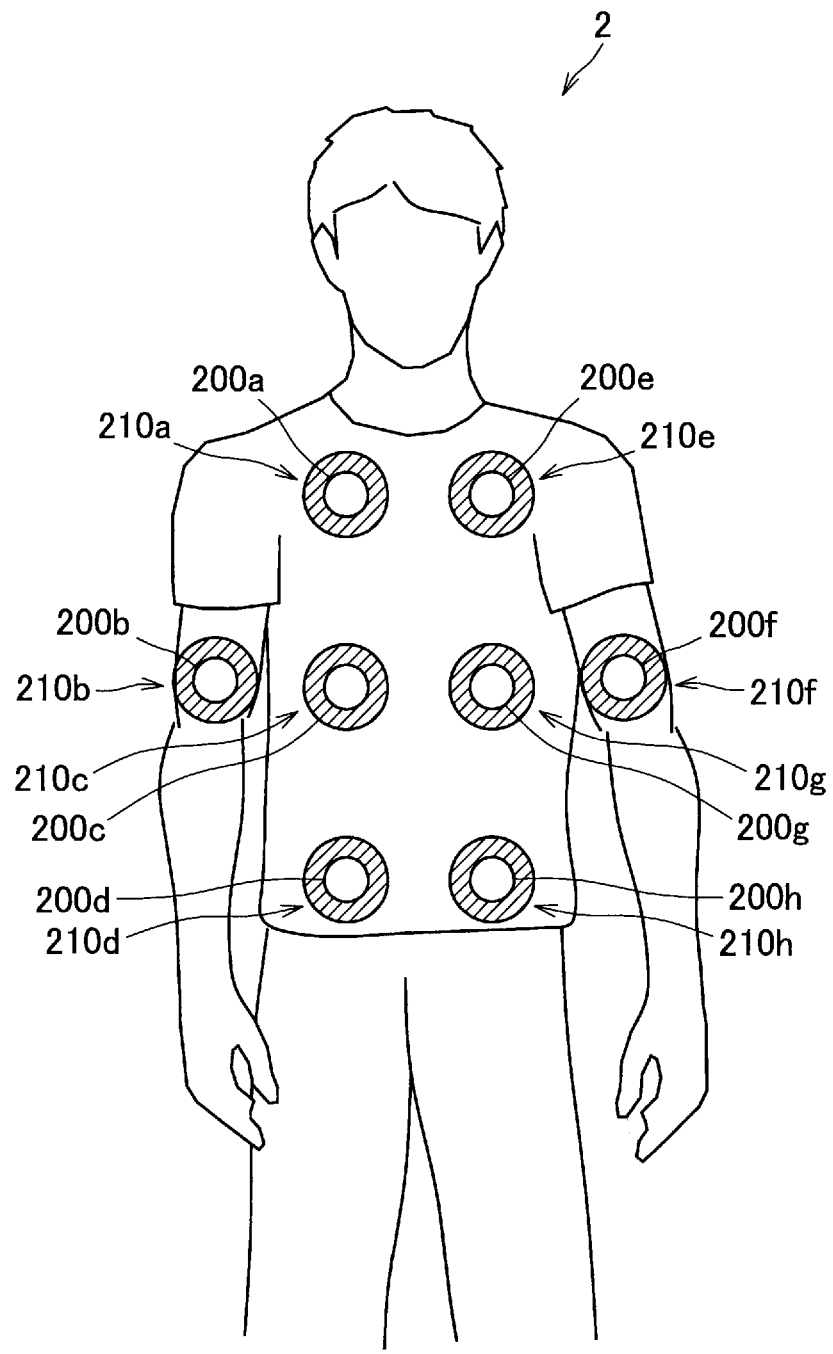
FIG. 3 is an explanatory diagram illustrating ranges in which tactile stimuli can be presented alone by individual tactile stimulus units 200.

Incidentally, in a case in which the plurality of tactile stimulus units 200 included in the jacket 20 each generate vibration alone, the generated vibration can be perceived only in peripheral portions 210 of the tactile stimulus units 200, for example, as illustrated in FIG. 3. That is, in a case in which the individual tactile stimulus units 200 are disposed apart, the vibration generated independently by the individual tactile stimulus units 200 can be discretely perceived on the body of the user.

On the other hand, an illusion sensation such as a phantom sensation has been medically elucidated. A phantom sensation is an illusion phenomenon in which human beings perceive only one stimulus between presented stimulus positions when stimuli are simultaneously presented at different positions on skin. For example, as illustrated in FIG. 4, When a stimulus is caused to be simultaneously output to two tactile stimulus units 200 disposed on the body of the user, a position of the stimulus perceived by the user (hereinafter referred to as a perceptual position) is known to be a position between the two tactile stimulus units 200.

Figure 4:
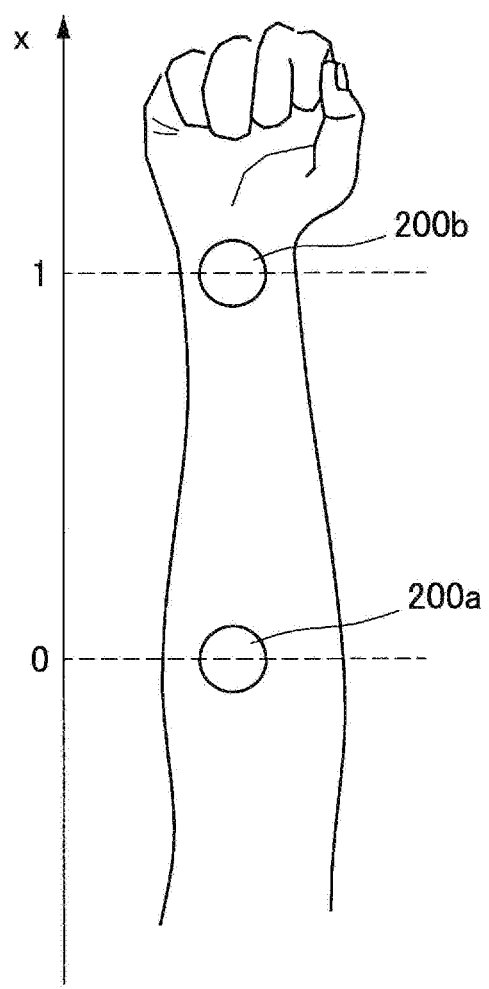
FIG. 4 is an explanatory diagram illustrating an example in which two tactile stimulus units 200 are disposed on the body of a user.
Figure 5:
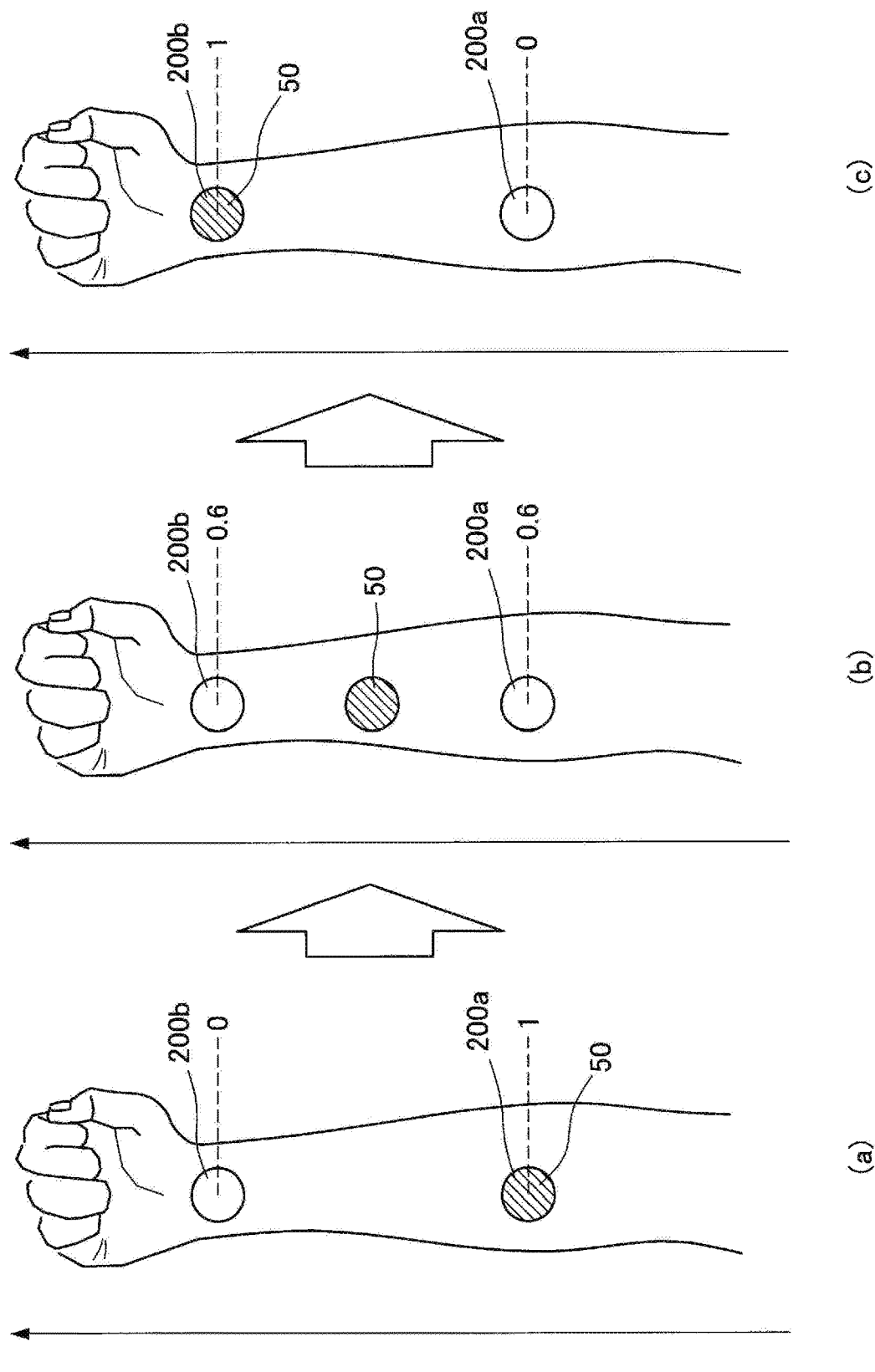
FIG. 5 is an explanatory diagram illustrating an example of a relation between perceptual positions and output intensities of two tactile stimulus units 200 in a situation illustrated in FIG. 4.

FIG. 5 is an explanatory diagram illustrating an example of a relation (an example of a phantom sensation) between perceptual positions and output intensities of two tactile stimulus units 200 in the situation illustrated in FIG. 4. For example, as illustrated in FIG. 5, it is assumed that, for example, an output intensity of the tactile stimulus unit 200a is successively weakened, such as "1," "0.6," and "0," and an output intensity of the tactile stimulus unit 200b is successively strengthened, such as "0," "0.6," and "1" over time. In this case, as illustrated in FIG. 5, a perceptual position 50 (perceived by the user) can be successively moved from a contact position of the tactile stimulus unit 200a to a contact position of the tactile stimulus unit 200b. By changing the output intensities of the plurality of tactile stimulus units 200 in this way, it is possible to successively expand a range of a tactile stimulus which can be presented by the plurality of tactile stimulus units 200 without changing a disposition interval of the individual tactile stimulus units 200.

1-1-2. Sound Output Unit 202

The sound output unit 202 outputs a sound in accordance with a control signal received from, for example, the server 10. As illustrated in FIG. 2, one sound output unit 202 can be disposed on each of the right and left of the jacket 20. For example, the sound output units 202 are disposed to be located on or near the shoulder of the user when the user wears the jacket 20. However, the present disclosure is not limited to this example. In the jacket 20, only one sound output unit 202 may be disposed or three or more sound output units 202 may be disposed. In addition, instead of being included in the jacket 20, the sound output unit 202 may be disposed as an independent device in a predetermined space or may be included in a mounting device (for example, a headphone, a headset, or the like) or a portable device (for example, a portable music player, a smartphone, a portable game device, or the like) different from the jacket 20.

1-2. Display Device 30

The display device 30 is a device that displays image information. For example, the display device 30 projects the image information to a projection target 4 in accordance with a control signal received from the server 10, as will be described. Note that, although the display device 30 is illustrated as an example of a projector in FIG. 1, the present disclosure is not limited to this example. The display device 30 may be a liquid crystal display (LCD) device, an organic light emitting diode (OLED) device, or the like. In addition, the display device 30 may be included in a portable device such as a tablet terminal or a smartphone or a mounting device such as an HMD or augmented reality (AR) glasses. In addition, in this case, the sound output units 202 and the display device 30 may be included in the same device.

1-3. Server 10

The server 10 is an example of an information processing device according to the present disclosure. The server 10 is a device that controls output of tactile stimuli to the plurality of tactile stimulus units 200 (or the jacket 20). For example, the server 10 controls generation of vibration on each of the plurality of tactile stimulus units 200 included in the jacket 20. Alternatively, in a case in which the jacket 20 has a function of controlling the plurality of tactile stimulus units 200, the server 10 can also instruct the jacket 20 to generate vibration in each of the plurality of tactile stimulus units 200.

In addition, the server 10 can have a function of controlling reproduction of content. Here, content includes an image (image information) and a sound (sound information). For example, the server 10 controls display of an image on the display device 30. In addition, the server 10 controls output of sounds to the sound output units 202. Thus, the user located within a predetermined space can simultaneously experience vibration generated by the plurality of tactile stimulus units 200, for example, while viewing a video display by the display device 30 and/or hearing music output by the sound output units 202.

In addition, the server 10 can communicate with other devices (the tactile stimulus units 200, the sound output units 202, the display device 30, and the like) via the communication network 32 to be described below, for example.

1-4. Communication Network 32

The communication network 32 is a wired or wireless transmission path of information transmitted from a device connected to the communication network 32. Examples of the communication network 32 may include a public line network such as a telephone network, the Internet, and a satellite communication network, various local area networks (LANs) including Ethernet (a registered trademark), and a wide area network (WAN). Further, the communication network 32 may include a dedicated network such as an Internet protocol-virtual private network (IP-VPN).

1-5. Summary of Problem

The configuration of the information processing system according to the embodiment has been described above. Incidentally, an intensity at which the user actually perceives vibration by the tactile stimulus unit 200 (hereinafter referred to as a perceptual intensity) is lowered in accordance with a distance from the tactile stimulus unit 200. For example, a perceptual intensity of vibration by the tactile stimulus unit 200 is lowered in inverse proportion to a distance from the tactile stimulus unit 200.

Figure 6:
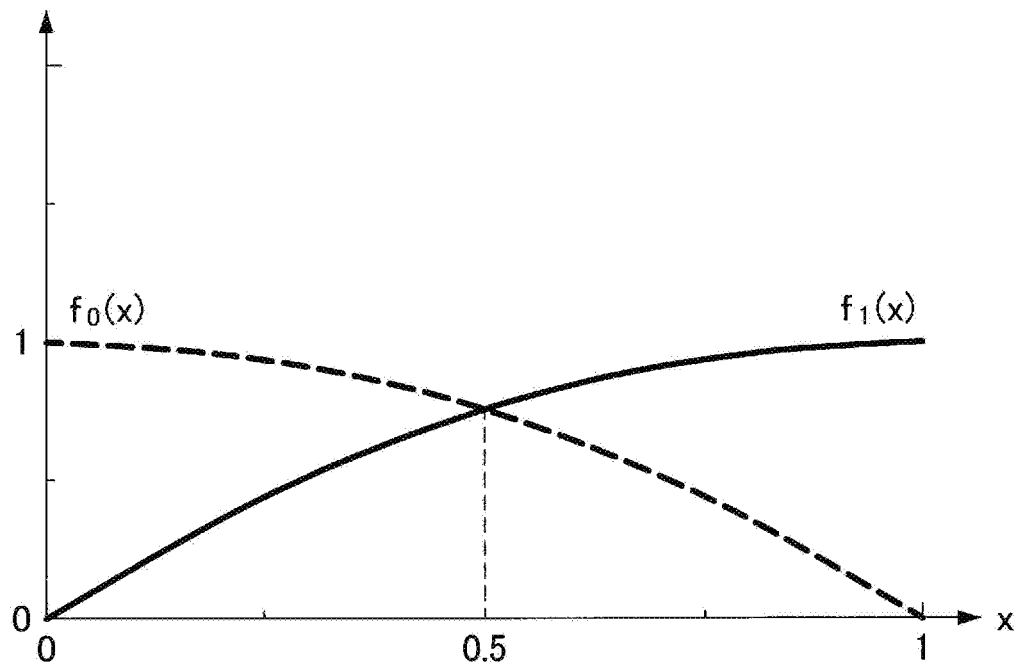
FIG. 6 is a graph illustrating a relation between a perceptual position and an output intensity set in each of two tactile stimulus units 200 according to a comparative example of the present disclosure.

Here, a comparative example of the present disclosure will be described. FIG. 6 is a graph illustrating a function f0(x) and a function f1(x) of output intensities of two tactile stimulus units 200 in the situation illustrated in FIG. 4 according to the comparative example. In the comparative example, the tactile stimulus unit 200a is caused to generate vibration with an output intensity like the function f0(x) illustrated in FIG. 6 and the tactile stimulus unit 200a is simultaneously caused to generate vibration with an output intensity like the function f1(x) illustrated in FIG. 6. Since the function f0(x) and the function f1(x) are functions of adjusting the output intensity of the tactile stimulus unit 200 nonlinearly, a sensation of a perceptual position moving can be presented more strongly to the user due to the phantom sensation.

Figure 7:
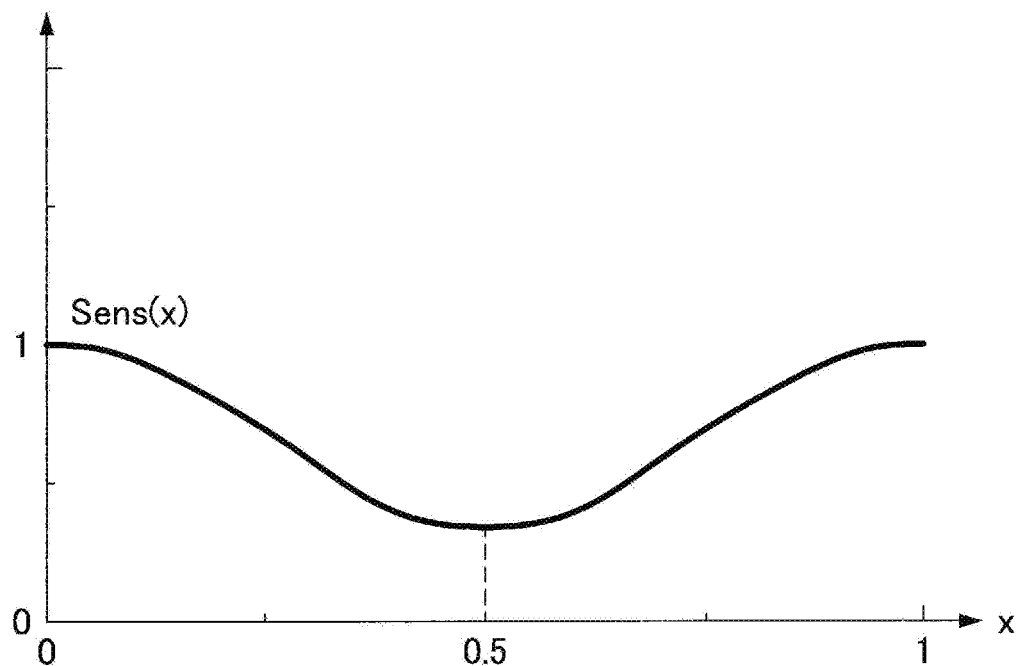
FIG. 7 is a graph illustrating a relation between a perceptual position and a perceptual intensity in a case in which a function illustrated in FIG. 6 is applied.

However, in this case, near a middle of a contact position of the tactile stimulus unit 200a and a contact position of the tactile stimulus unit 200b, the perceptual intensity may be considerably lowered compared to the two contact positions, as in the graph illustrated in FIG. 7. Therefore, in the comparative example, it is difficult to present a tactile stimulus with a desired perceptual intensity at a desired perceptual position to the user.

Accordingly, the server 10 according to the embodiment was invented in view of the foregoing circumstances. In accordance with predetermined positional information on the body of the user and information regarding tactile output related to the predetermined positional information, the server 10 according to the embodiment changes output of one or more tactile stimulus units 200 corresponding to the predetermined positional information. Here, the information regarding the tactile output includes, for example, a target perceptual intensity of a tactile stimulus or a (target) tactile output value.

For example, the server 10 can change the output intensity of one or more tactile stimulus units 200 in accordance with a position which is a tactile stimulus target and a target perceptual intensity at the position. Therefore, for example, the user can be caused to perceive a tactile stimulus (vibration or the like) so that the perceptual intensity is substantially constant between the contact positions of the plurality of tactile stimulus units 200.

2. Detailed Description of Embodiment

2-1. Configuration

Figure 8:
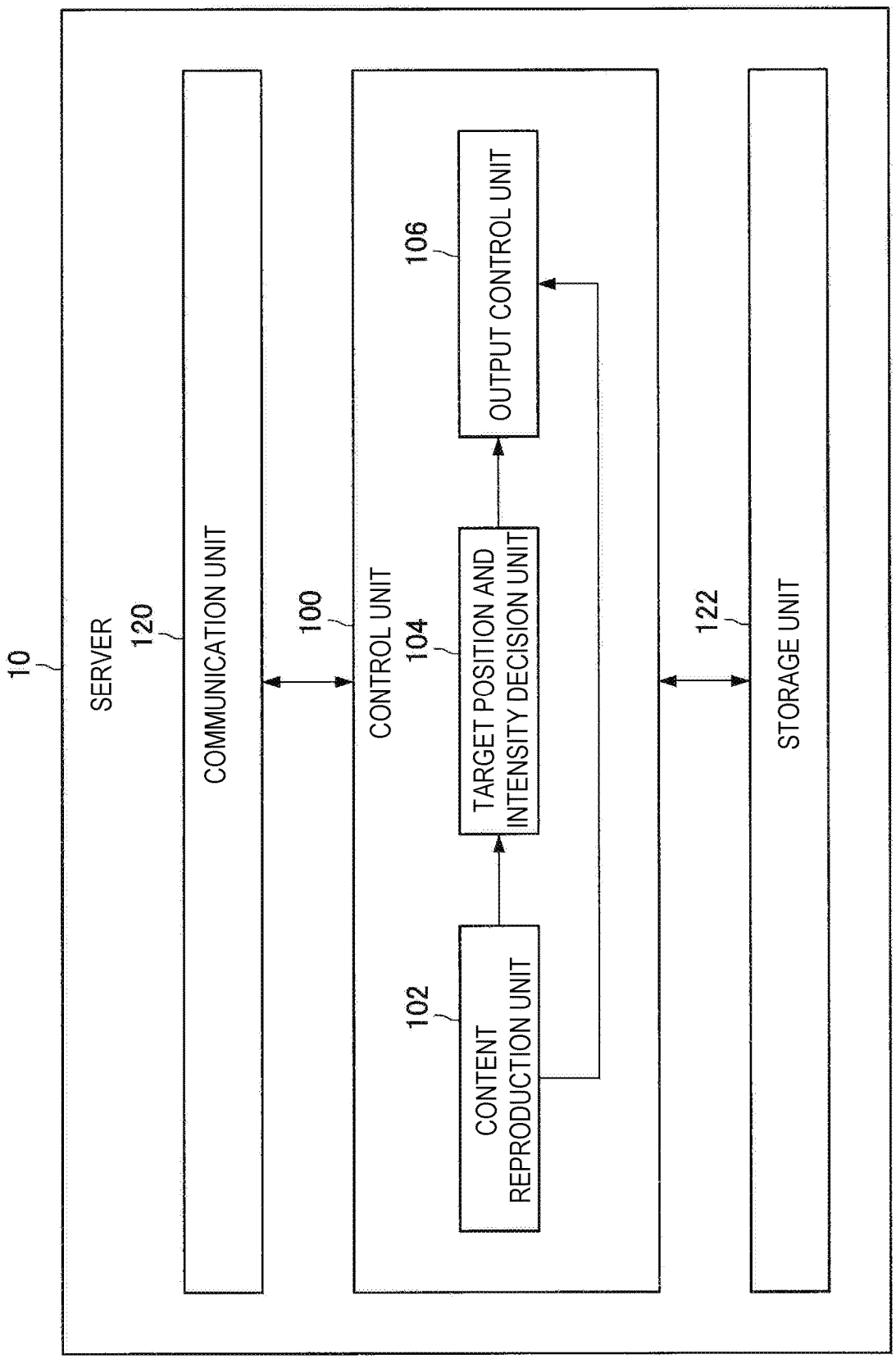
FIG. 8 is a functional block diagram illustrating a configuration example of a server 10 according to the embodiment.

Next, a configuration of the server 10 according to the embodiment will be described in detail. FIG. 8 is a functional block diagram illustrating a configuration example of the server 10 according to the embodiment. As illustrated in FIG. 8, the server 10 includes a control unit 100, a communication unit 120, and a storage unit 122.

2-1-1. Control Unit 100

The control unit 100 generally controls an operation of the server 10 using hardware such as a central processing unit (CPU) 150 or a random access memory (RAM) 154 to be described below contained in the server 10. In addition, as illustrated in FIG. 8, the control unit 100 includes a content reproduction unit 102, a target position and intensity decision unit 104, and an output control unit 106.

2-1-2. Content Reproduction Unit 102

The content reproduction unit 102 controls reproduction of content. For example, in a case in which reproduction target content includes an image, the content reproduction unit 102 performs control of display of the image on the display device 30. In addition, in a case in which the reproduction target content includes a sound, the content reproduction unit 102 performs control of output of a sound on the sound output units 202.

In addition, the content reproduction unit 102 can cause the display device 30 and/or the sound output units 202 to reproduce the reproduction target content in association with output control of a tactile stimulus by the output control unit 106 to be described below. For example, the content reproduction unit 102 reproduces content in synchronization with timing of generation of vibration by one or more tactile stimulus units 200.

Note that a kind of reproduction target content may be decided on the basis of pre-decided setting information (a reproduction list or the like) or may be decided in response to a reproduction request input by the user.

2-1-3. Target Position and Intensity Decision Unit 104

2-1-3-1. Deciding Target Perceptual Position

The target position and intensity decision unit 104 decides a target perceptual position of a tactile stimulus and a target perceptual intensity at the perceptual position at a predetermined timing. Here, the target perceptual position can basically be set on the body of the user. For example, the target position and intensity decision unit 104 decides a target perceptual position of a tactile stimulus and the target perceptual intensity at the perceptual position at a predetermined timing in accordance with reproduction target content. As one example, the target position and intensity decision unit 104 decides a target perceptual position and a target perceptual intensity at each timing in accordance with an image displayed and/or a sound output at each timing during a reproduction period of the reproduction target content.

Movement Path

For example, in a case in which a target movement path is associated with reproduction target content in advance, the target position and intensity decision unit 104 decides a target perceptual position at each tinting during a reproduction period of the content on the basis of the target movement path. Alternatively, the target position and intensity decision unit 104 may decide a target perceptual position at a future predetermined timing in real time in accordance with a current (target) perceptual position and content which is currently being reproduced.

Figure 9:
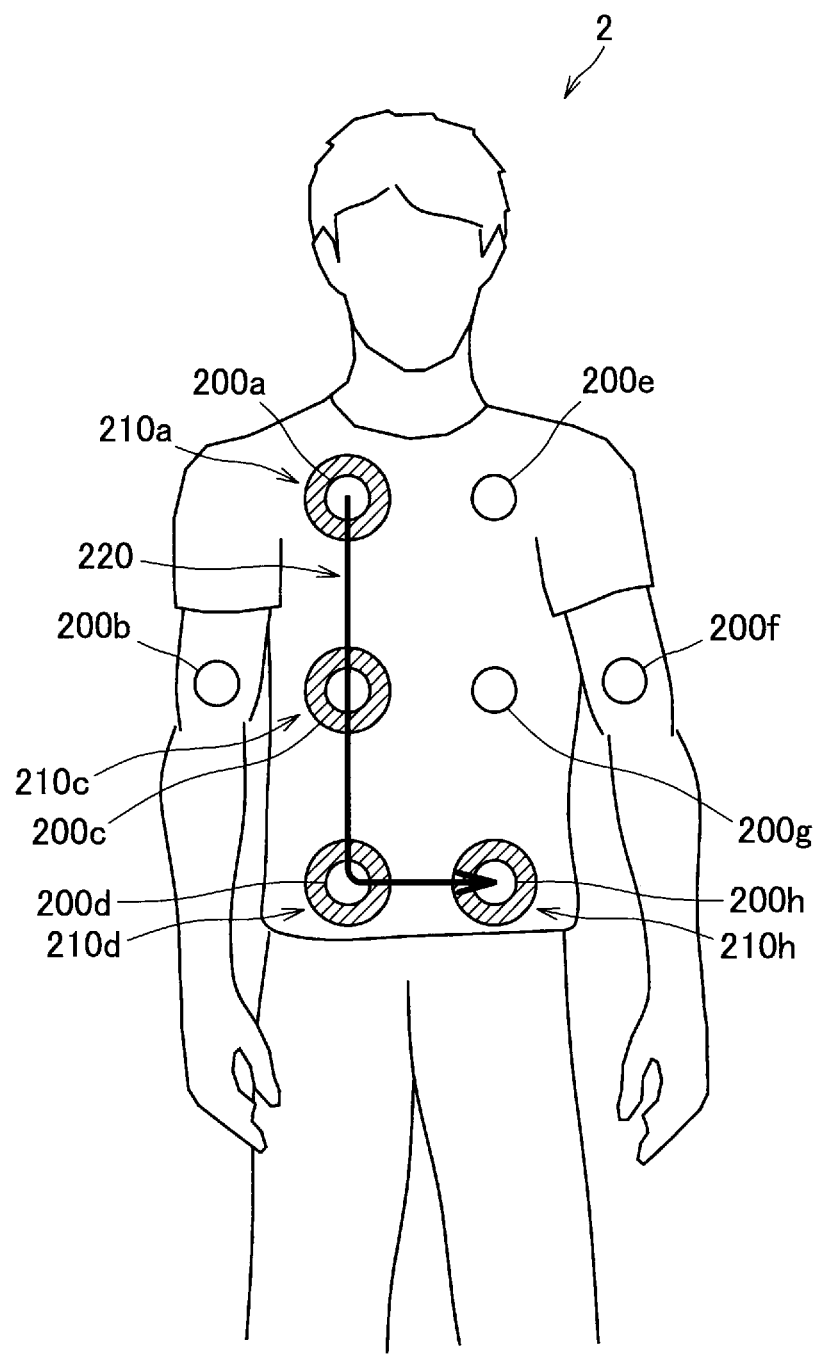
FIG. 9 is an explanatory diagram illustrating an example of a movement path 220 of a target perceptual position set on the body of the user.

Here, the target movement path can be set on the surface of the body of the user. FIG. 9 is an explanatory diagram illustrating an example of a target movement path 220 set on the body of the user. FIG. 9 illustrates an example in which the target movement path 220 is a path connecting a contact position of the tactile stimulus unit 200a, a contact position of the tactile stimulus unit 200c, a contact position of the tactile stimulus unit 200d, and a contact position of the tactile stimulus unit 200h. In this case, a tactile stimulus can be presented to the user so that the perceptual position is successively moved from the contact position of the tactile stimulus unit 200a which is a starting point to the contact position of the tactile stimulus unit 200h which is an ending point.

Figure 10:
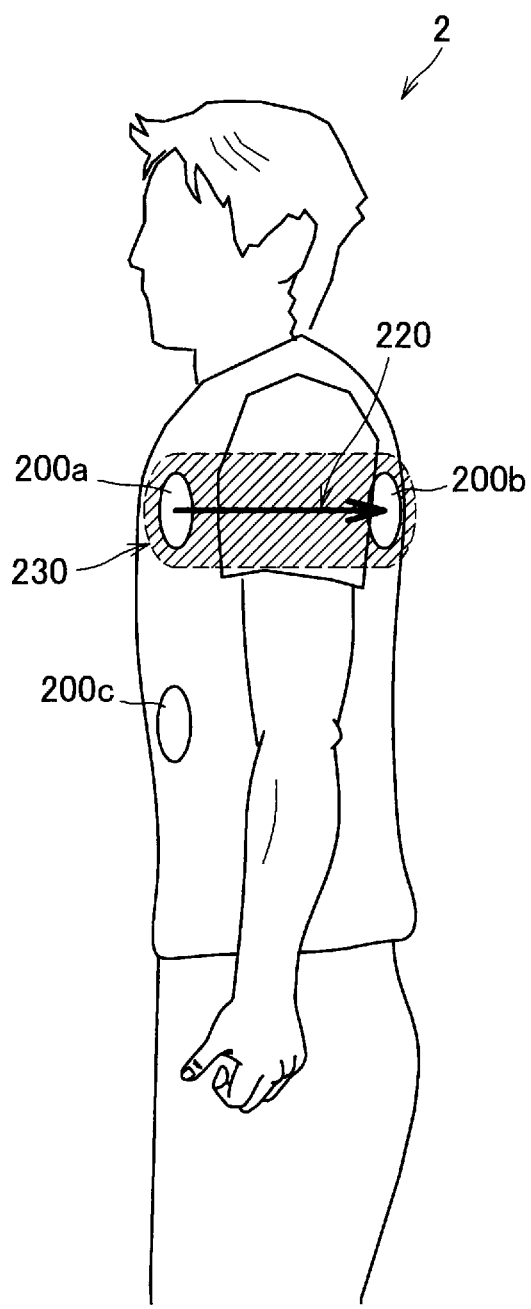
FIG. 10 is an explanatory diagram illustrating another example of the movement path 220 of the target perceptual position.

Alternatively, the target movement path can be set as a path connecting a first surface of the body of the user, an inside of the body of the user, and a second surface opposite the first surface. Here, the first surface can be a front surface of the user and the second surface can be the rear surface of the user. Alternatively, for example, the first surface is a front side surface of a predetermined part of the body such as an arm and the second surface is a rear side surface of that part of the body. FIG. 10 is an explanatory diagram illustrating another example of the target movement path 220. FIG. 10 illustrates an example in which the target movement path 220 is a path connecting the contact position of the tactile stimulus unit 200a on the front surface of the user, an inside of the body of the user, and the contact position of the tactile stimulus unit 200b on the rear surface of the user. In this case, a sensation of piercing an inside of the body from the front surface to the rear surface can be presented to the user.

Movement Region

In addition, in a case in which a target movement region is associated with reproduction target content in advance, the target position and intensity decision unit 104 can decide a set (region) of a target perceptual position at each timing during a reproduction period of the content on the basis of the target movement region. Alternatively, the target position and intensity decision unit 104 may decide a set of a target perceptual position at a future predetermined timing in real time in accordance with a set of a current (target) perceptual position and content which is currently being reproduced.

Figure 11:
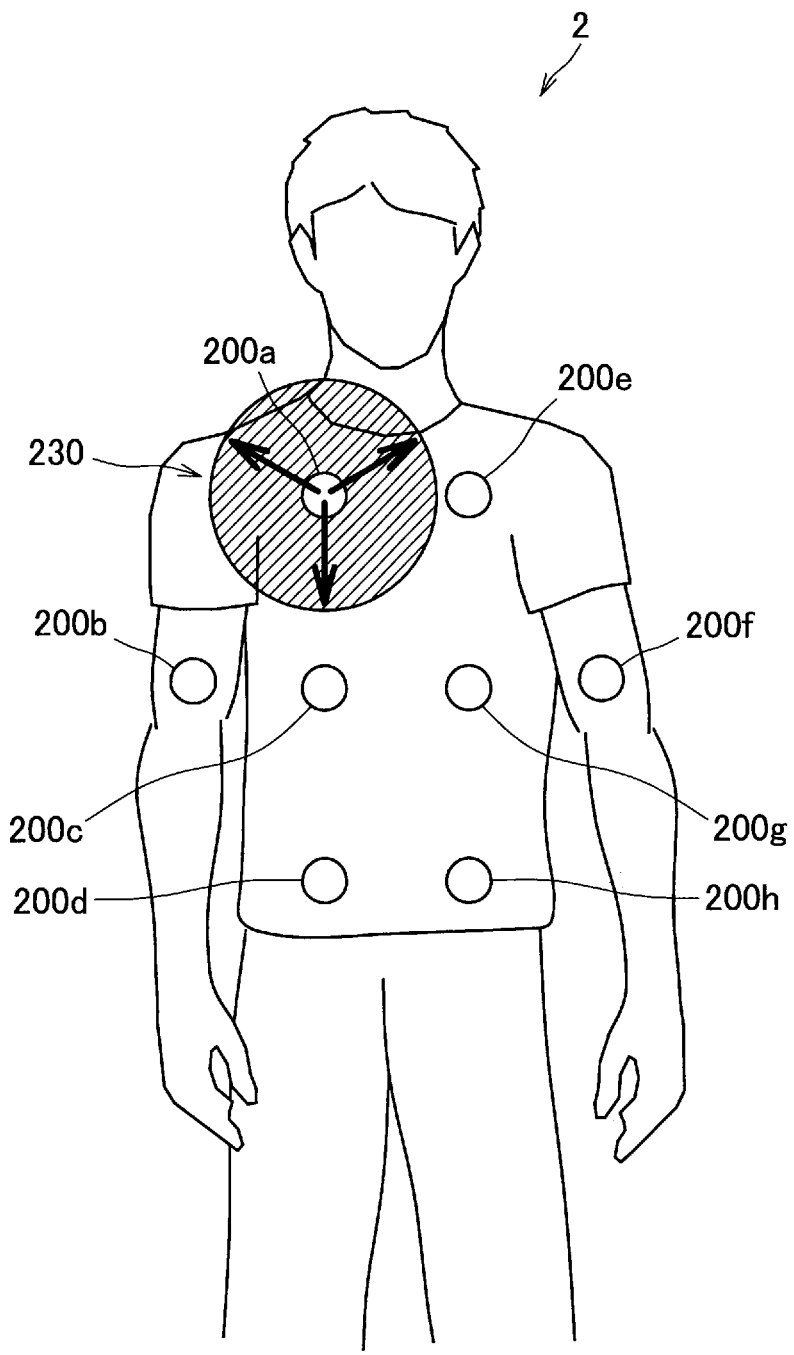
FIG. 11 is an explanatory diagram illustrating an example in which a range 230 of a target perceptual position is enlarged.

Here, the target movement region can be set as a region that spreads in area over time on the body of the user. FIG. 11 is an explanatory diagram illustrating an example in which a target movement region 230 of a target perceptual position is set on the body of the user. FIG. 11 illustrates an example in which the target movement region 230 is a region in which a set of the target perceptual positions spreads in area over time using the contact position of the tactile stimulus unit 200a as a starting point. For example, the target movement region 230 is a region in which a distance between the contact position of the tactile stimulus unit 200a and the set of the target perceptual positions gradually increases over time. In this case, a tactile stimulus can be presented to the user so that a perceptual position successively spreads in area using the contact position of the tactile stimulus unit 200a which is a starting point as a reference. Note that the contact position (that is, a starting point of the target movement region) of the tactile stimulus unit 200a is an example of a third position in the present disclosure.

2-1-3-2. Deciding Target Perceptual Intensity

In addition, the target position and intensity decision unit 104 can decide a target perceptual intensity at each timing during the reproduction period of reproduction target content in accordance with the content.

Decision Example 1

For example, a target movement path (or a target movement region) can be associated with a target perceptual intensity at each position on the target movement path (or the target movement region) in advance. In this case, the target position and intensity decision unit 104 first decides a target movement path in accordance with, for example, the reproduction target content and decides a target perceptual intensity at each timing during a reproduction period of the content on the basis of the target movement path. Note that the target perceptual intensity at each position on the target movement path (or the target movement region) may be decided all equally or may be decided differently for each position. In addition, the target perceptual intensity at each position on the target movement path (or the target movement region) may be set manually by the user.

Alternatively, the target position and intensity decision unit 104 may decide the target perceptual intensity at a future predetermined timing in real time in accordance with a current (target) perceptual intensity and content which is currently being reproduced.

Decision Example 2

Alternatively, a waveform of the target perceptual intensity can be registered in advance. In this case, the target position and intensity decision unit 104 can decide the target perceptual intensity at the target perceptual position, for example, in real time on the basis of the waveform of the target perceptual intensity and the decided target perceptual position. Note that the waveform of the target perceptual intensity may be a constant function or may be registered in association with the reproduction target content.

2-1-4. Output Control Unit 106

2-1-4-1. Successive Movement of Target Position

The output control unit 106 controls generation of vibration in the plurality of tactile stimulus units 200 corresponding to the target perceptual position in accordance with the target perceptual position and the target perceptual intensity decided by the target position and intensity decision unit 104. For example, the output control unit 106 first specifies the plurality of tactile stimulus units 200 (for example, three tactile stimulus units) located near the current target perceptual position. Then, the output control unit 106 decides an output intensity of each of the plurality of tactile stimulus units 200 on the basis of a positional relation between each of the plurality of tactile stimulus units 200 and the target perceptual position and the current target perceptual intensity. Thus, for example, the user can perceive vibration of the current target perceptual intensity at the current target perceptual position.

In addition, when the target perceptual position and the target perceptual intensity decided by the target position and intensity decision unit 104 are changed over time, the output control unit 106 sequentially adjusts the output intensity of each of the plurality of tactile stimulus units 200 corresponding to the changed target perceptual position.

Specific Example

For example, as illustrated in FIG. 9, it is assumed that the target movement path 220 is set on the surface of the body of the user and the target perceptual intensity along the target movement path 220 is decided constantly. In this case, the output control unit 106 adjusts the output intensities of the plurality of corresponding tactile stimulus units 200 so that vibration of the same perceptual intensity is successively moved at each position on the target movement path 220 over time.

Alternatively, as illustrated in FIG. 10, it is assumed that the target movement path 220 is set as a movement path connecting the front surface and the rear surface of the body of the user. In this case, the output control unit 106 adjusts the output intensities of the plurality of corresponding tactile stimulus units 200 so that the perceptual position passes through an inside of the body along the target movement path 220 over time.

Alternatively, as illustrated in FIG. 11, it is assumed that the target movement region 230 is set as a region spreading in area. In this case, the output control unit 106 adjusts the output intensities of the plurality of corresponding tactile stimulus units 200 so that the distance between the starting point (for example, the contact position of the tactile stimulus unit 200a) and the set (range) of the perceptual positions successively increases over time.

Figure 12:
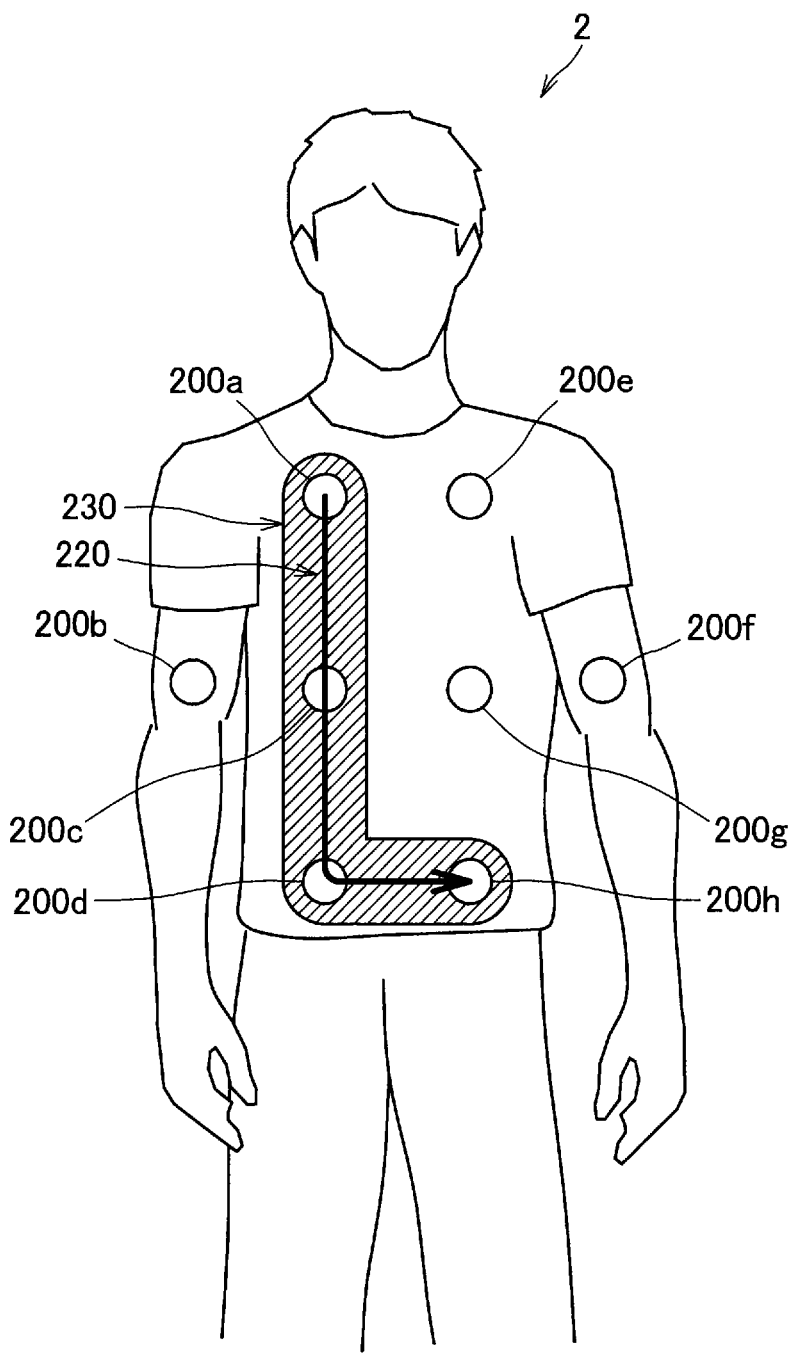
FIG. 12 is an explanatory diagram illustrating an example in which the range 230 of the target perceptual position is successively moved along the target movement path 220.

Alternatively, as illustrated in FIG. 12, the output control unit 106 adjusts the output intensities of the plurality of corresponding tactile stimulus units 200 so that the range 230 of the target perceptual position is successively moved along the target movement path 220.

2-1-4-2. Controlling Output Intensity Using Presentation Distance

In addition, the output control unit 106 can change an output intensity of the tactile stimulus unit 200 (decided on the basis of the target perceptual intensity) on the basis of a distance between a target perceptual position and the tactile stimulus unit 200 located near the target perceptual position. For example, in a case in which the tactile stimulus unit 200*a* and the tactile stimulus unit 200*b* are located near the target perceptual position, the output control unit 106 changes the output intensity of the tactile stimulus unit 200*a* on the basis of a distance between the contact position of the tactile stimulus unit 200*a* on the body of the user and the target perceptual position. In addition, the output control unit 106 changes the output intensity of the tactile stimulus unit 200*b* on the basis of a distance between the contact position of the tactile stimulus unit 200*b* on the body of the user and the target perceptual position. Here, the tactile stimulus unit 200*a* is an example of a first tactile stimulus unit according to the present disclosure and the tactile stimulus unit 200*b* is an example of a second tactile stimulus unit according to the present disclosure.

Correction Example of Output Intensity Between Two Points

Hereinafter, the foregoing function will be described in more detail. First, an adjustment example of output intensities of two tactile stimulus units 200 in a case in which a target perceptual position is located between the two tactile stimulus units 200 will be described. For example, the output control unit 106 changes each of the output intensity of the tactile stimulus unit 200*a* and the output intensity of the tactile stimulus unit 200*b* on the basis of a positional relation between a middle position of the contact position of the tactile stimulus unit 200*a* and the contact position of the tactile stimulus unit 200*b* and the target perceptual position. Here, the middle position is an example of a fourth position according to the present disclosure.

For example, the output control unit 106 may change the output intensities of the tactile stimulus unit 200*a* and the tactile stimulus unit 200*h* so that a SUM value of the output intensity of the tactile stimulus unit 200*a* and the output intensity of the tactile stimulus unit 200*b* is larger as the distance between the middle position and the target perceptual position is smaller. Alternatively, in a case in which the target perceptual position is located to be closer to the contact position of the tactile stimulus unit 200*a* than the contact position of the tactile stimulus unit 200*b*, the output control unit 106 may change the output intensity of the tactile stimulus unit 200*a* so that the output intensity of the tactile stimulus unit 200*a* is larger as a distance between the contact position of the tactile stimulus unit 200*a* and the target perceptual position is larger. In addition, the same applies to the tactile stimulus unit 200*b* (that is, a reverse relation is satisfied).

Simultaneously, the output control unit 106 changes a ratio of the output intensity of the tactile stimulus unit 200*a* to the output intensity of the tactile stimulus unit 200*b* on the basis of the positional relation between the middle position and the target perceptual position.

Figure 13:
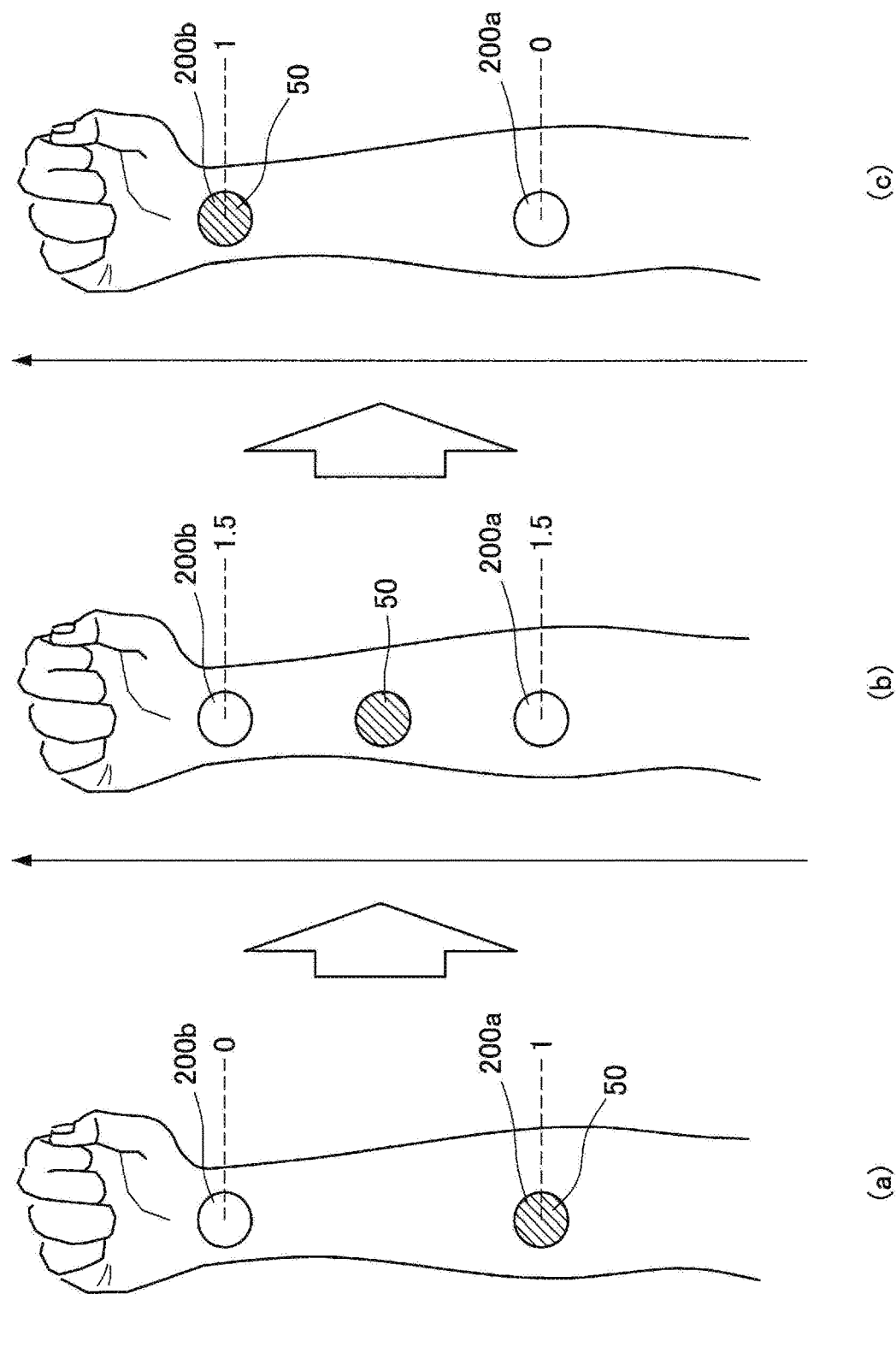
FIG. 13 is an explanatory diagram illustrating an example in which an output intensity adjustment function according to the embodiment is applied in the situation illustrated in FIG. 4.

FIG. 13 is an explanatory diagram illustrating an example of a scene in which the foregoing adjustment of the output intensities is applied and which corresponds to the example illustrated in FIG. 5. Note that (a) and (c) of FIG. 13 illustrate situation in which the target perceptual position 50 matches the contact position of the tactile stimulus unit 200*a* or the contact position of the tactile stimulus unit 200*b*. In addition, (h) of FIG. 13 illustrates a timing at which the target perceptual position 50 is located at the middle position of the two tactile stimulus units 200. For example, at a timing illustrated in (a) of FIG. 13, the output control unit 106 sets the output intensity of the tactile stimulus unit 200*a* to "1" and sets the output intensity of the tactile stimulus unit 200*b* to "0." In addition, at a timing illustrated in (b) of FIG. 13, the output control unit 106 sets the output intensity of the tactile stimulus unit 200*a* to "1.5" and sets the output intensity of the tactile stimulus unit 200*h* to "1.5." In addition, at a timing illustrated in (c) of FIG. 13, the output control unit 106 sets the output intensity of the tactile stimulus unit 200*a* to "0" and sets the output intensity of the tactile stimulus unit 200*b* to "1." That is, the output control unit 106 adjusts the output intensities of the tactile stimulus unit 200*a* and the tactile stimulus unit 200*b* so that a sum of the output intensities of the two tactile stimulus units 200 is larger in a case in which the distance of the middle position of the two tactile stimulus units 200 and the target perceptual position 50 is small ((b) of FIG. 13) than in a case in which the distance of the middle position and the target perceptual position 50 is large ((a) and (c) of FIG. 13).

Figure 14:
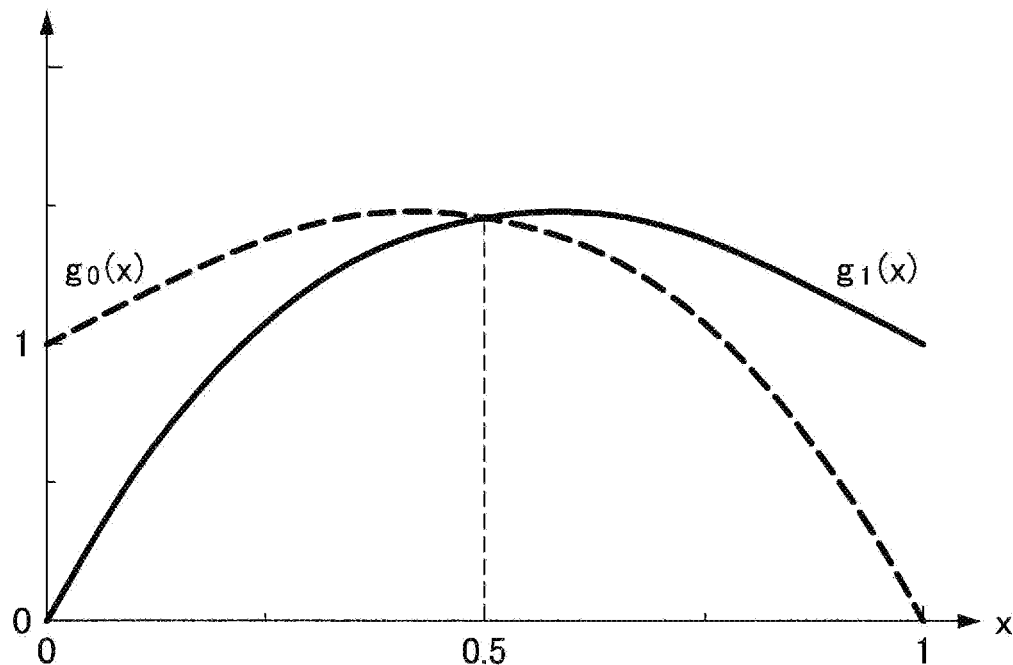
FIG. 14 is an explanatory diagram illustrating an example of an output intensity adjustment function according to the embodiment.

For example, the output control unit 106 obtains a function g0(x) illustrated in FIG. 14 by multiplying the function f0(x) illustrated in FIG. 6 by an adjustment function h0(x) as in the following Expression (1). Here, the function g0(x) is a function indicating the output intensity of the tactile stimulus unit 200*a* in a case in which a target perceptual position is x. In addition, the adjustment function h0(x) is a function that increases the output intensity of the tactile stimulus unit 200*a* in proportion to a distance between the tactile stimulus unit 200*a* and the target perceptual position.

[Math. 1]

$$g_0(x) = h_0(x) \times f_0(x) \qquad \text{Expression (1)}$$

Similarly, the output control unit 106 obtains a function g1(x) illustrated in FIG. 14 by multiplying the function f1(x) illustrated in FIG. 6 by an adjustment function h1(x) as in the following Expression (2). Here, the function g1(x) is a function indicating the output intensity of the tactile stimulus unit 200*b* in a case in which the target perceptual position is x. In addition, the adjustment function h1(x) is a function that increases the output intensity of the tactile stimulus unit 200*h* in proportion to a distance between the tactile stimulus unit 200*b* and the target perceptual position. Note that the function f0(x) and the function f1(x) are not limited to a square root function illustrated in FIG. 6 and may be function of a logarithmic relation or linearity (a linear function or the like).

[Math. 2]

$$g_1(x) = h_1(x) \times f_1(x) \qquad \text{Expression (2)}$$

Figure 15:
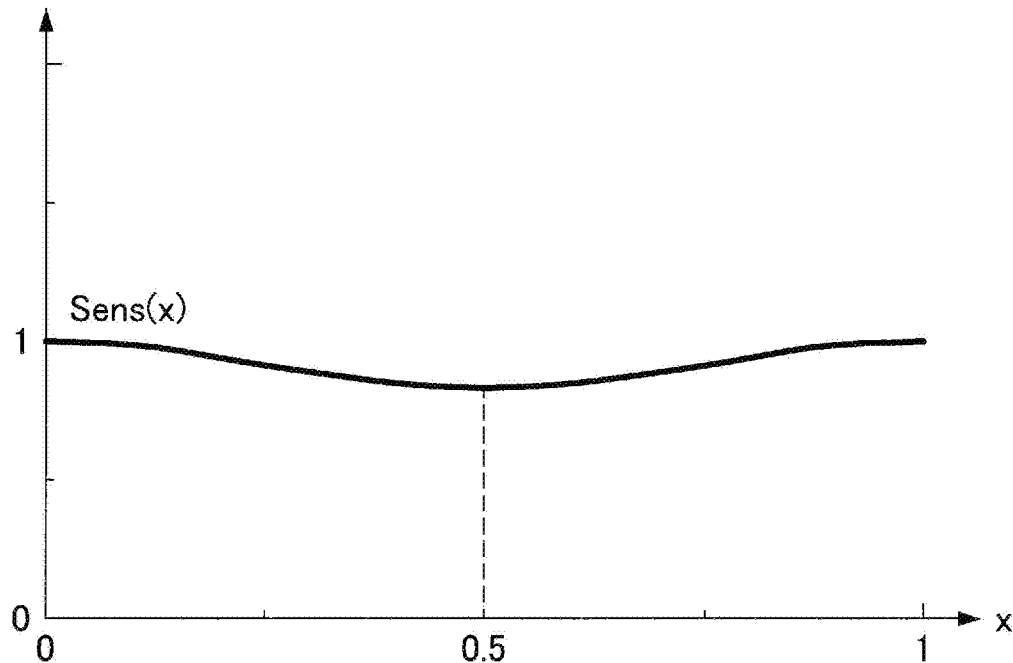
FIG. 15 is a graph illustrating a relation between a perceptual position and a perceptual intensity in a case in which the function illustrated in FIG. 15 is applied.

In addition, FIG. 15 is a graph illustrating an example of a relation between the target perceptual position (=x) and a perceptual intensity in a scene in which the function g0(x) and the function g1(x) are used. Specifically, FIG. 15 illustrates a graph in a case in which the target perceptual intensity is set to "1" in an entire section between the two tactile stimulus units 200, vibration is generated in the tactile stimulus unit 200*a* using the function g0(x) illustrated in FIG. 14, and vibration is generated in the tactile stimulus unit 200*b* using the function g1(x) illustrated in FIG. 14. As illustrated in FIG. 15, the perceptual intensity can be substantially constant in the entire section between the tactile stimulus unit 200*a* and the tactile stimulus unit 200*b* by applying the function g0(x) and the function g1(x). For example, even in a case in which the target perceptual position is located near the middle position, the perceptual intensity is not substantially lowered.

Correction Example of Planar Output Intensity

Next, a planar adjustment example of output intensities of the plurality of tactile stimulus units 200 will be described. More specifically, an adjustment example of output intensities of three tactile stimulus units 200 in a case in which a target perceptual position is located inside a triangle decided at contact positions of the three tactile stimulus units 200 will be described.

For example, with regard to each of the three tactile stimulus units 200, the output control unit 106 changes the output intensities of the tactile stimulus units 200 on the basis of a distance between the contact position of the tactile stimulus unit 200 and the target perceptual position.

Figure 16:
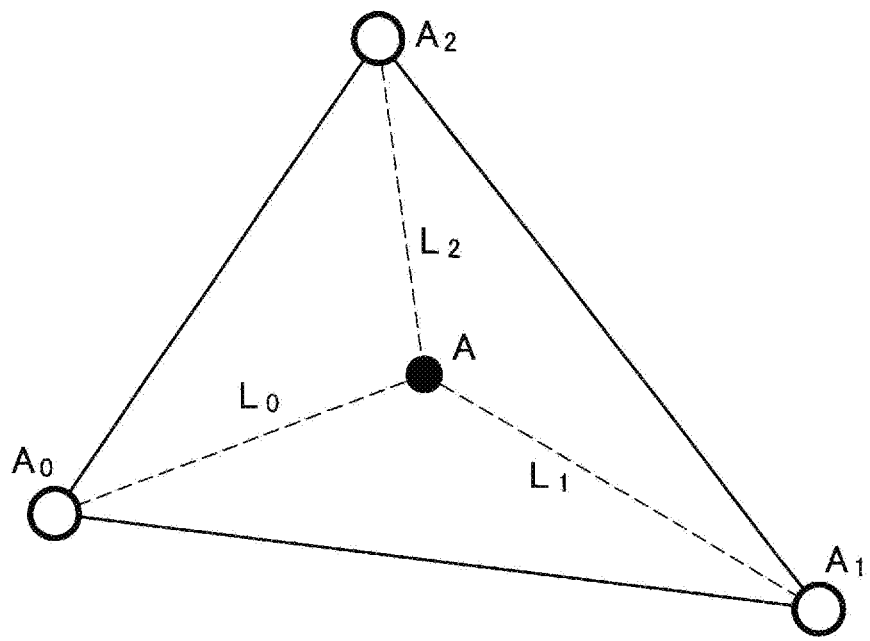
FIG. 16 is an explanatory diagram illustrating a planar adjustment example of output intensities of a plurality of tactile stimulus units 200.

Here, the foregoing function will be described in more detail with reference to FIG. 16. Note that FIG. 16 illustrates an example in which a point A is a target perceptual position. For example, the output control unit 106 (temporarily) calculates an output intensity of each of three tactile stimulus units 200 on the basis of a positional relation between contact positions (A0, A1, and A2) of the three tactile stimulus units 200 located near the point A. Then, with regard to each of the three tactile stimulus units 200, the output control unit 106 changes (corrects) the calculated output intensity on the basis of distance between the contact position of the tactile stimulus unit 200 and the target perceptual position (L0, L1, or L2 in the example illustrated in FIG. 16). According to the control example, for example, in a case in which the target perceptual intensities in the entire range of the triangle are set to the same value, perceptual intensities (actually perceived by the user) at all the positions inside the triangle can be substantially constant. For example, even in a case in which the target perceptual position is located near the center of gravity of the triangle, the perceptual intensity is not substantially lowered.

Overlap of Triangle

Figure 17:
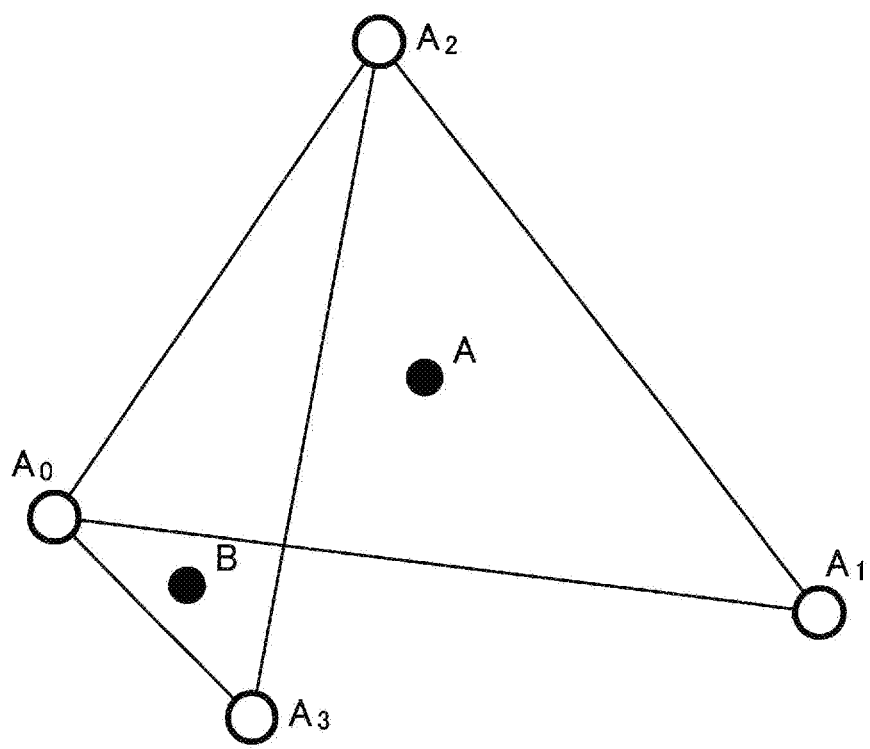
FIG. 17 is an explanatory diagram illustrating an example in which triangles configured with regard to two target perceptual positions overlap.

Note that in a case in which a plurality of target perceptual positions are set, decision of mutual overlap of triangles configured at individual target perceptual positions can be permitted. For example, as illustrated in FIG. 17, a triangle decided at contact positions (A0, A1, and A2) of three tactile stimulus units 200 located near a first target perceptual position (a point A) and a triangle decided at contact positions (A0, A2, and A3) of three tactile stimulus units 200 located near a second target perceptual position (a point B) may overlap each other.

Modification Example

Here, modification examples of the method of adjusting the output intensities of the plurality of tactile stimulus units 200 described above will be described. For example, in a case in which a perceptual position (or a sensitivity feature) is uncertain (for example, specifying the perceptual position is not enabled), the output control unit 106 may set all the parameters of the foregoing adjustment function to be applied to the individual tactile stimulus units 200 to a predetermined value (the same value).

In addition, the contact position of the tactile stimulus unit 200 on the body of the user is uncertain in some cases. For example, in a case in which a device including the tactile stimulus units 200 is a belt type of device, the user wears the device on his or her wrist in some cases or wears his or her ankle in some cases. Accordingly, in a case in which the contact positions of the tactile stimulus units 200 are uncertain, the output control unit 106 may decide values of parameters of the adjustment function of the output intensities of the individual tactile stimulus units 200 on the assumption that the individual tactile stimulus units 200 are located at an equal interval.

In addition, contact pressures of the tactile stimulus units 200 on the body of the user are uncertain in some cases. For example, in a case in which the user wears the jacket 20, a gap can occur between the jacket 20 and the body, but the gap may not be detected in some cases. Accordingly, in a case in which the contact pressures of the tactile stimulus units 200 are uncertain, the output control unit 106 may set parameters of the adjustment function of the output intensities of the tactile stimulus units 200 to a predetermined value.

In addition, in a case in which one of the plurality of tactile stimulus units 200 in contact with the body of the user is broken down, the output control unit 106 can also change values of the parameters of the adjustment function of the output intensities of the tactile stimulus units 200 located near the corresponding tactile stimulus unit 200 (from values before the breakdown). Thus, even when one tactile stimulus unit 200 is broken down, a presentation region of the tactile stimulus to the user can be prevented from missing.

In addition, in a case in which it is measured or estimated that a contact pressure of at least one tactile stimulus unit 200 is less than a predetermined threshold, the output control unit 106 may interrupt the generation of the vibration by all the tactile stimulus units 200, Alternatively, in this case, the output control unit 106 may interrupt the output of the tactile stimulus by the corresponding tactile stimulus unit 200 and may change the values of the parameters of the adjustment function of the output intensities of the tactile stimulus units 200 located near the corresponding tactile stimulus units 200 (from the values before the interruption).

2-1-4-3. Controlling Movement Speed

In addition, the output control unit 106 can further decide a movement speed of a target position. For example, the output control unit 106 may set the movement speed of the target position to a predetermined value or may dynamically change the movement speed of the target position.

In the latter case, for example, the output control unit 106 may dynamically change the movement speed of the target position in accordance with reproduction target content (by the content reproduction unit 102). Alternatively, the output control unit 106 may change the movement speed of the target position on the basis of, for example, a rotational speed of the body of the user or a measurement result of a manipulation speed of the user on a predetermined device. Note that the rotational speed of the body of the user can be specified on the basis of measurement decision by various sensors such as an acceleration sensor and a gyroscope carried or worn by the user. Here, various sensors may be included in the jacket 20, may be included in the tactile stimulus units 200, or may be included in another device carried or worn by the user. In addition, a rotational speed of the body of the user may be specified by combining measurement results by other sensors (for example, the tactile stimulus units 200 include acceleration sensors, and the jacket 20 includes a gyroscope, and the like) included in other devices.

2-1-4-4. Dynamic Change in Output Intensity

Figure 18:
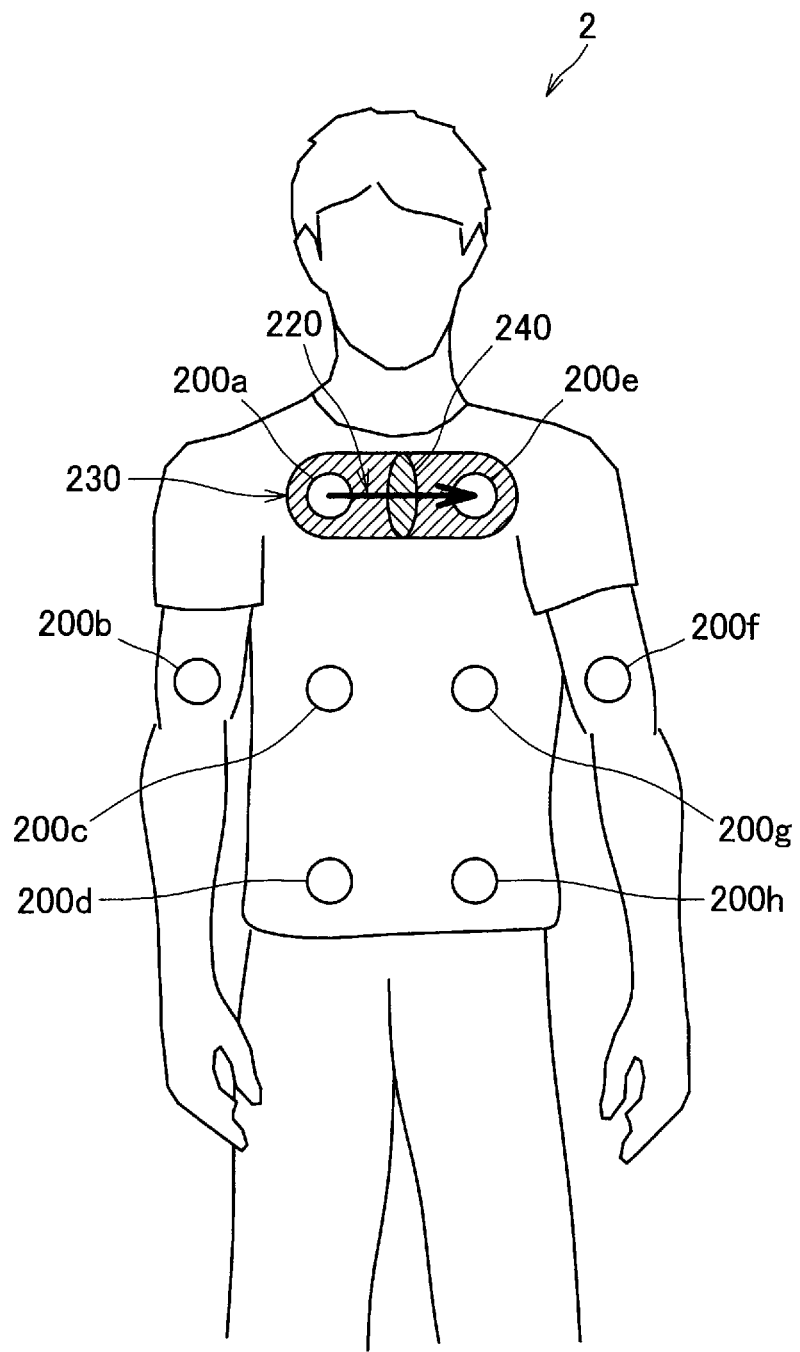
FIG. 18 is an explanatory diagram illustrating an example in which a range 240 of a perceptual position which is currently moving is emphatically vibrated.

In addition, the output control unit 106 may further dynamically change the output intensities of the plurality of tactile stimulus units 200 on the basis of a predetermined standard. For example, the output control unit 106 can dynamically change the output intensities of the plurality of tactile stimulus units 200 on the basis of a perceptual position which is currently being moved (or a range of the perceptual position). As one example, as illustrated in FIG. 18, the output control unit 106 relatively increases a target perceptual intensity in a range 240 of the perceptual position which is current being moved, while the range 230 of the target perceptual position is successively moved along the target movement path 220. Thus, it is possible to further emphasize the perceptual position which is currently being moved and presents the perceptual position to the user.

In addition, the output control unit 106 can dynamically change the output intensities of the plurality of tactile stimulus units 200 on the basis of prediction of a movement direction of the perceptual position. For example, the output control unit 106 may relatively decrease the output intensities in a movement source or a movement destination of the perceptual position. Thus, contrast of the movement of the perceptual position can be emphasized and presented to the user.

Alternatively, the output control unit 106 can dynamically change the output intensities of the plurality of tactile stimulus units 200 on the basis of a positional relation between a predetermined region and a perceptual position on the body of the user. For example, the output control unit 106 may control generation of vibration in the plurality of tactile stimulus units 200 so that the perceptual position is moved avoiding the predetermined region on the body of the user. Note that the predetermined region can be, for example, a predetermined part near a heart or the like, a region in which an injury occurs, or the like.

In addition, human beings generally have different perceptual intensities of tactile stimuli depending on parts. Accordingly, the output control unit 106 can also further dynamically change the output intensities of the plurality of tactile stimulus units 200 depending on parts including a target perceptual position. For example, in a case in which the target perceptual position is included in a part with high sensitivity, the output control unit 106 relatively weakens the output intensities of the plurality of tactile stimulus units 200. In addition, in a case in which the target perceptual position is included in a part with low sensitivity, the output control unit 106 relatively strengthens the output intensities of the plurality of tactile stimulus units 200. Alternatively, the output control unit 106 may change frequencies of vibration generated in the plurality of tactile stimulus units 200 (instead of the output intensities) depending on a part including the target perceptual position. Thus, without depending on the part including the perceptual position, a desired perceptual intensity at the perceptual position can be presented to the user.

Alternatively, the output control unit 106 can also further dynamically change the output intensities of the plurality of tactile stimulus units 200 in accordance with a movement speed of a target perceptual position. For example, the output control unit 106 dynamically changes a peak value (a maximum value) of the output intensities or change amounts of the output intensities of the plurality of tactile stimulus units 200. As one example, the output control unit 106 further decreases the maximum value of the output intensities or the change amounts of the output intensities as the movement speed of the target perceptual position is faster.

In addition, features with regard to the generation of the vibration can differ depending on the individual tactile stimulus units 200. Accordingly, for example, in a case in which the features of the individual tactile stimulus units 200 are known in advance, the output control unit 106 may further dynamically change the output intensities of the individual tactile stimulus units 200 in accordance with the features of the individual tactile stimulus units 200. For example, the output control unit 106 changes a ratio between the output intensities of the individual tactile stimulus units 200 in accordance with the features of the individual tactile stimulus units 200.

In addition, the perceptual intensities of tactile stimuli can generally differ in accordance with contact pressures of the tactile stimulus units 200 on the body of the user. Accordingly, the output control unit 106 may further dynamically change the output intensities (values of the parameters of the adjustment function of the output intensities) of the individual tactile stimulus units 200 on the basis of a measurement result or an estimation result of the contact pressures of the individual tactile stimulus units 200. Note that the contact pressures of the tactile stimulus units 200 can be measured or estimated in accordance with the following method. For example, in a case in which the tactile stimulus units 200 include pressure sensors, the contact pressures of the tactile stimulus units 200 can be measured by the pressure sensors. Alternatively, the contact pressure of the tactile stimulus unit 200 can be estimated on the basis of analysis of a change in a current value in the tactile stimulus unit 200. For example, a relation between the contact pressure on a human body (or another object) and the current value in the tactile stimulus unit 200 can be obtained in advance by, for example, a developer. In this case, the contact pressure of the tactile stimulus unit 200 can be estimated on the basis of a measurement result of the current value in the tactile stimulus unit 200 and the measurement result.

Alternatively, in a case in which the tactile stimulus units 200 are worn by the body of the user for example, a case in which the user wears the jacket 20 or the like), the contact pressures of the tactile stimulus units 200 can be estimated on the basis of attitudes of the tactile stimulus units 200 and/or the contact pressures of the tactile stimulus units 200. Note that the attitudes of the tactile stimulus units 200 can be measured on the basis of, for example, gyroscopes and acceleration sensors contained in the tactile stimulus units 200. In addition, an attitude of the user can be measured on the basis of gyroscopes and acceleration sensors contained in another device carried or worn by the user.

2-1-5. Communication Unit 120

The communication unit 120 transmits and receives information to and from another device. For example, the communication unit 120 transmits a control signal of output of a tactile stimulus to each of the plurality of tactile stimulus units 200 (or the jacket 20) under the control of the output control unit 106. In addition, the communication unit 120 transmits a control signal of display of a reproduction target image to the display device 30 and transmits a control signal of output of a reproduction target sound to each of the plurality of sound output units 202 (or the jacket 20) wider the control of the content reproduction unit 102.

2-1-6. Storage Unit 122

The storage unit 1 stores various kinds of data or various kinds of software.

2-2. Operation

Figure 19:
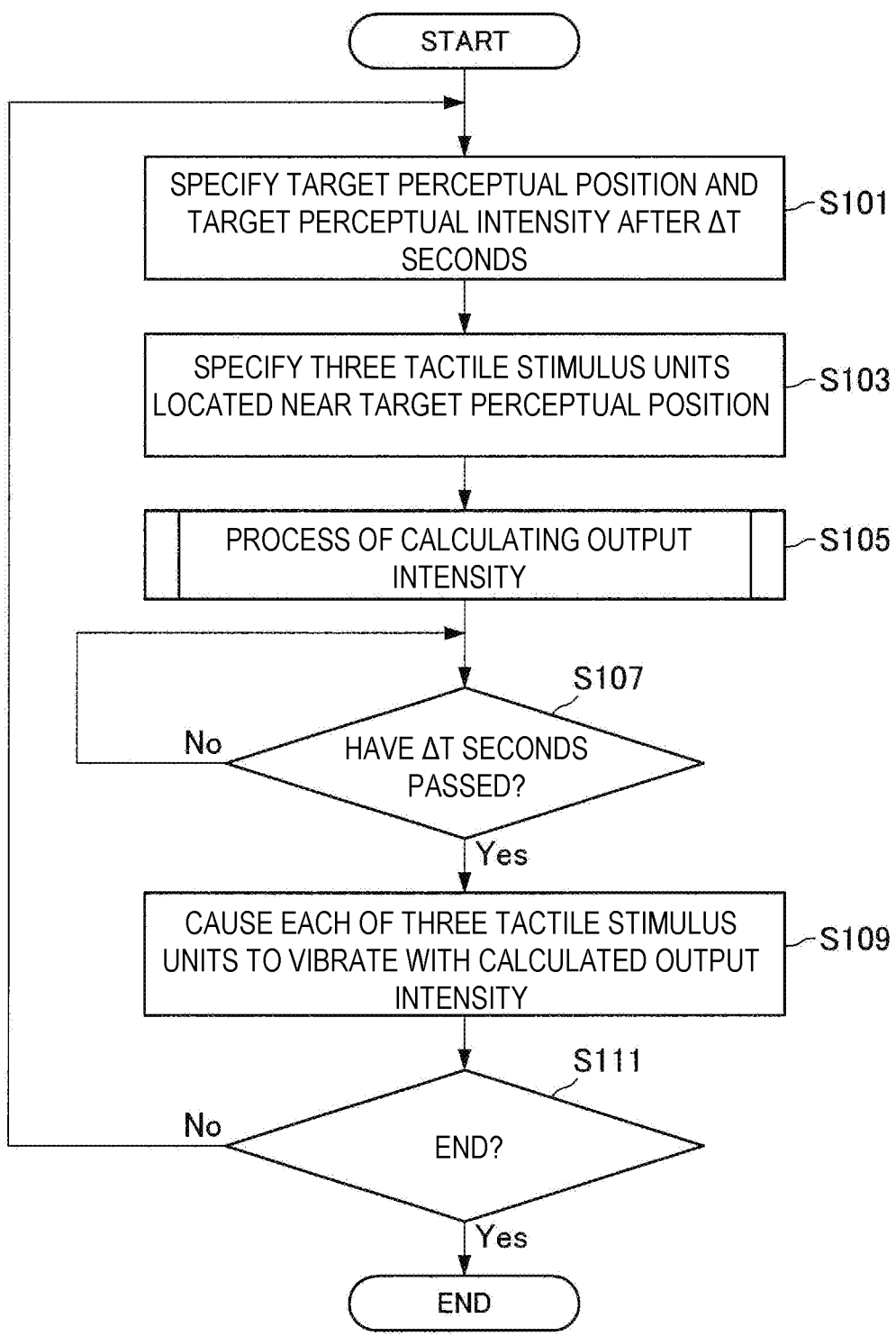
FIG. 19 is a flowchart illustrating an overall flow of an operation example according to the embodiment.

The configuration according to the embodiment has been described above. Next, an example of an operation according to the embodiment will be described with reference to FIG. 19. FIG. 19 is a flowchart illustrating an operation example according to the embodiment.

2-2-1. Overall Flow of Operation

As illustrated in FIG. 19, the target position and intensity decision unit 104 of the server 10 first decides a target perceptual position of a tactile stimulus and a target perceptual intensity at the perceptual position after a unit time (ΔT seconds) of a current time in accordance with, for example, content or the like which is currently being reproduced (S101).

Subsequently, the output control unit 106 specifies three tactile stimulus units 200 located near the target perceptual position (S103).

Subsequently, the output control unit 106 performs "a process of calculating an output intensity" to be described below (S105).

Thereafter, the output control unit 106 waits until ΔT seconds have passed from the time point of S101 (S107), Then, when ΔT seconds have passed (Yes in S107), the output control unit 106 causes a tactile stimulus with the output intensity calculated in S105 to be output to each of the three tactile stimulus units 200 (S109).

Thereafter, the server 10 determines whether or not a predetermined ending condition is satisfied (S111). In a case in Which the server 10 determines that the predetermined ending condition is not satisfied (No in S111), the server 10 performs the processes subsequent to S101 again. Conversely, in a case in which the server 10 determines that the predetermined ending condition is satisfied (Yes in S111), the server 10 ends the operation. Note that the predetermined ending condition can be a condition that a predetermined time has passed from start of the operation, a condition that reproduction target content ends, or a condition that the user inputs an ending instruction.

2-2-2. Process of Calculating Output Intensity

Figure 20:
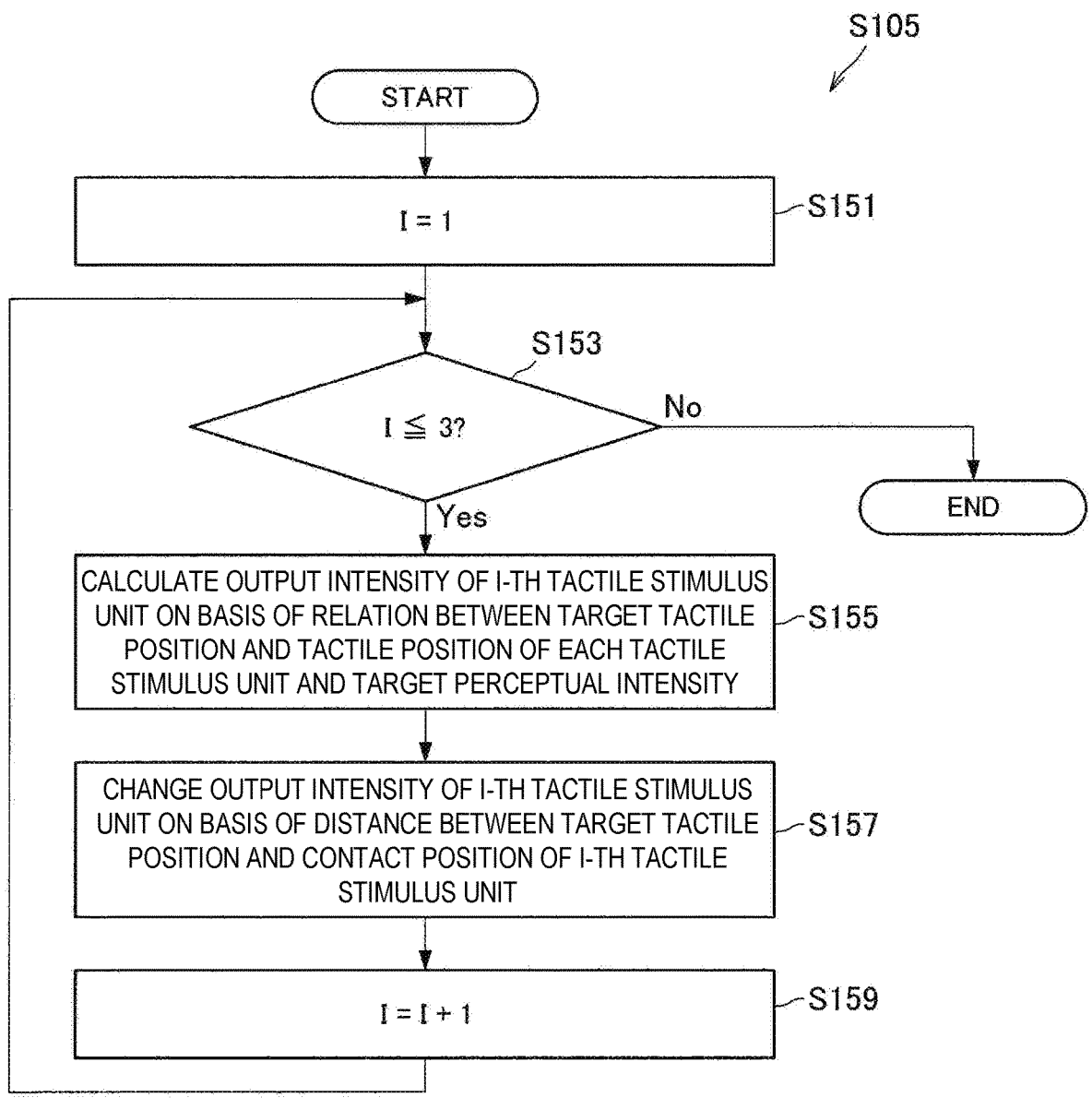
FIG. 20 is a flowchart illustrating a flow of an "output intensity calculation process" according to the embodiment.

Here, a flow of "the process of calculating the output intensity" in S105 will be described with reference to FIG. 20. As illustrated in FIG. 20, the output control unit 106 first sets "1" in a variable I indicating a numeral of a processing target tactile stimulus unit 200 among the three tactile stimulus units 200 specified in S103 (S151).

Then, the output control unit 106 repeats the process of the following S155 to S159 as long as the value of I is equal to or less than "3" (S153).

Specifically, the output control unit 106 first calculates an output intensity of an I-th tactile stimulus unit 200 (temporarily) on the basis of a positional relation between the target perceptual position decided in S101 and a contact position of each of the three tactile stimulus units 200 and the target perceptual intensity decided in S101 (S155).

Subsequently, the output control unit 106 changes (corrects) the output intensity calculated in S155 on the basis of a distance between the target perceptual position and the contact position of the I-th tactile stimulus unit 200 (S157). Then, the output control unit 106 adds "1" to I (S159).

2-3. Advantageous Effects

As described above, the server 10 according to the embodiment changes the output intensities of one or more tactile stimulus units 200 corresponding to predetermined positional information in accordance with the predetermined positional information on the body of the user and the target perceptual intensity of the tactile stimulus related to the positional information. Therefore, the user can be caused to perceive the tactile stimulus with an intensity adapted to the positional information on the body of the user. For example, the user can be caused to perceive a tactile stimulus (vibration or the like) so that the perceptual position is successively moved between the contact positions of the plurality of tactile stimulus units 200 and the perceptual intensity is substantially constant during the movement.

3. Application Examples

3-1. Application Example 1

Figure 21:
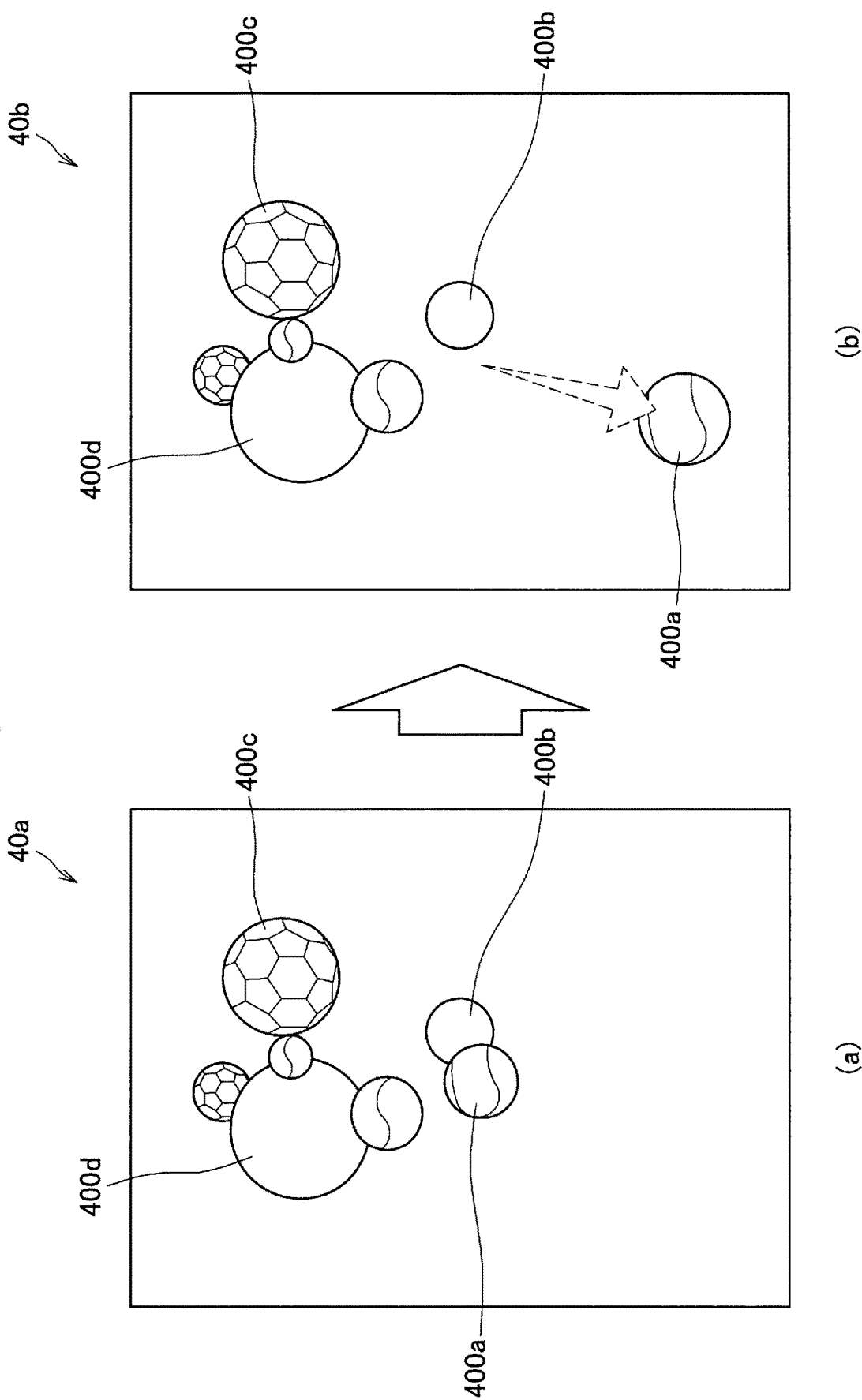
FIG. 21 is a diagram illustrating images 40 displayed in Application Example 1 of the embodiment.

Next, application examples of the above-described embodiment will be described. First, Application Example 1 of the embodiment will be described with reference to FIGS. 21 and 22. FIG. 21 is a diagram illustrating images 40 displayed by the display device 30 in Application Example 1. The images 40 are images (for example, 3-dimensional computer graphics (CG) images or the like) generated using a viewpoint of the user as a standard. Note that in the example illustrated in FIG. 21, the images 40 include ball type objects 400. The objects 400 are examples of target regions according to the present disclosure.

Figure 22:
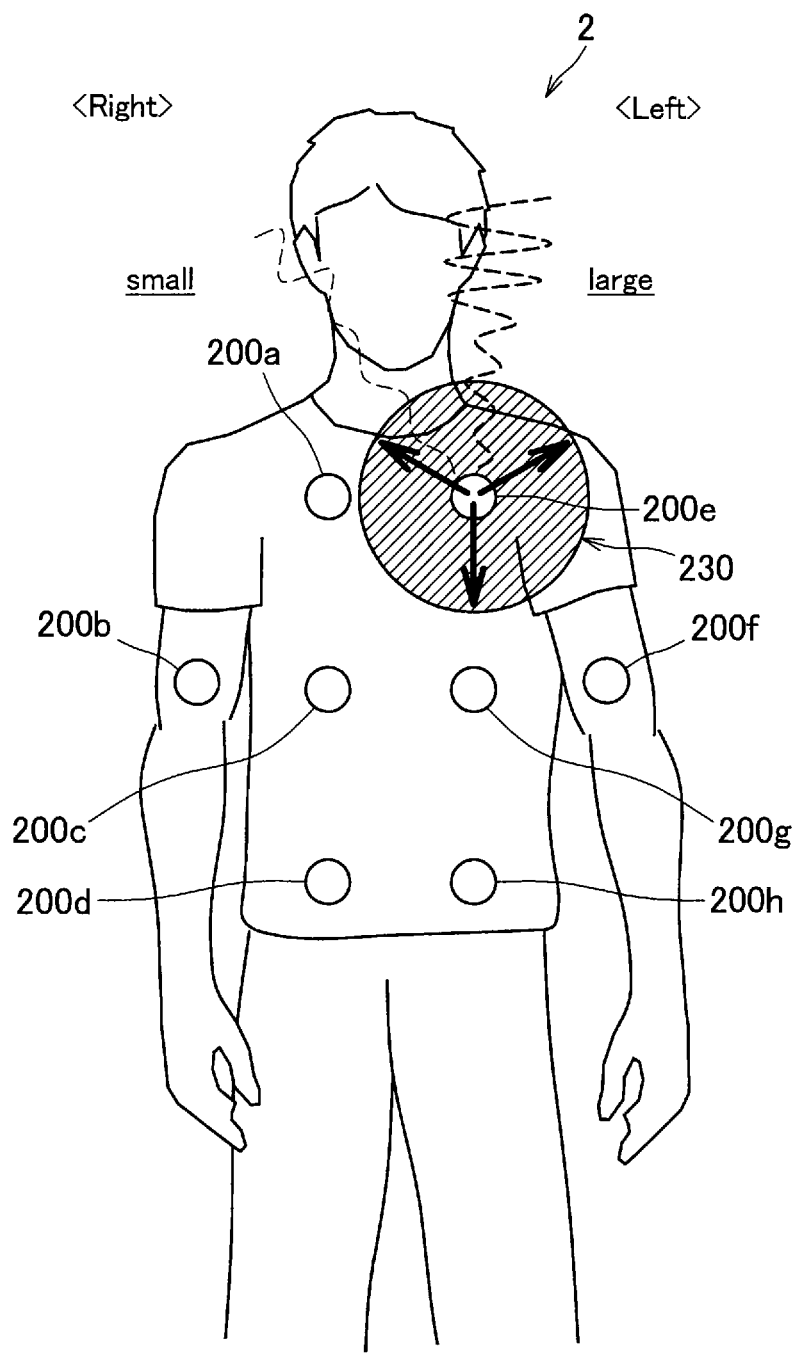
FIG. 22 is a schematic diagram illustrating a tactile stimulus and a sound output to the user in Application Example 1.

As illustrated in FIG. 21, an image is assumed to successively transition from the image 40a to the image 40b so that an object 400a is moved to the front left side in the image 40, that is, an animation is displayed as the object 400a is hit on the left side of the body of the user. In this case, as illustrated in FIG. 22, the output control unit 106 first specifies a position (collision position) on the body of the user corresponding to the position of the object 400a in the image 40b illustrated in (b) of FIG. 21. Note that in the example illustrated in FIG. 22, the collision position is near the contact position of a tactile stimulus unit 200e.

Then, the output control unit 106 controls output of the tactile stimuli to the plurality of tactile stimulus units 200 located nearby such that, for example, a set 230 of target perceptual positions spreads in area from a specific position serving as a starting point over time. Thus, a sensation of propagating an impact to the vicinity from the collision position serving as a starting point can be presented to the user.

Simultaneously, the content reproduction unit 102 causes the two sound output units 202 to output impact sounds as an impact sound is coming from the collision position on the body of the user, as indicated by two dotted-line curves in FIG. 22. For example, since the collision position is located on the left side of the body of the user, as illustrated in FIG. 22, the content reproduction unit 102 causes the sound output unit 202b on the left side of the body of the user to output the impact sound with a larger volume and causes the sound output unit 202a on the right side of the body of the user to output the impact sound with a smaller volume.

According to Application Example 1, the video in which the ball is hit on the body of the user can be displayed and a tactile stimulus and an acoustic sound optimum for the video can be simultaneously presented to the user. By presenting a multimodal expression to the user, a higher realistic sensation can be realized.

3-2. Application Example 2

Figure 23:
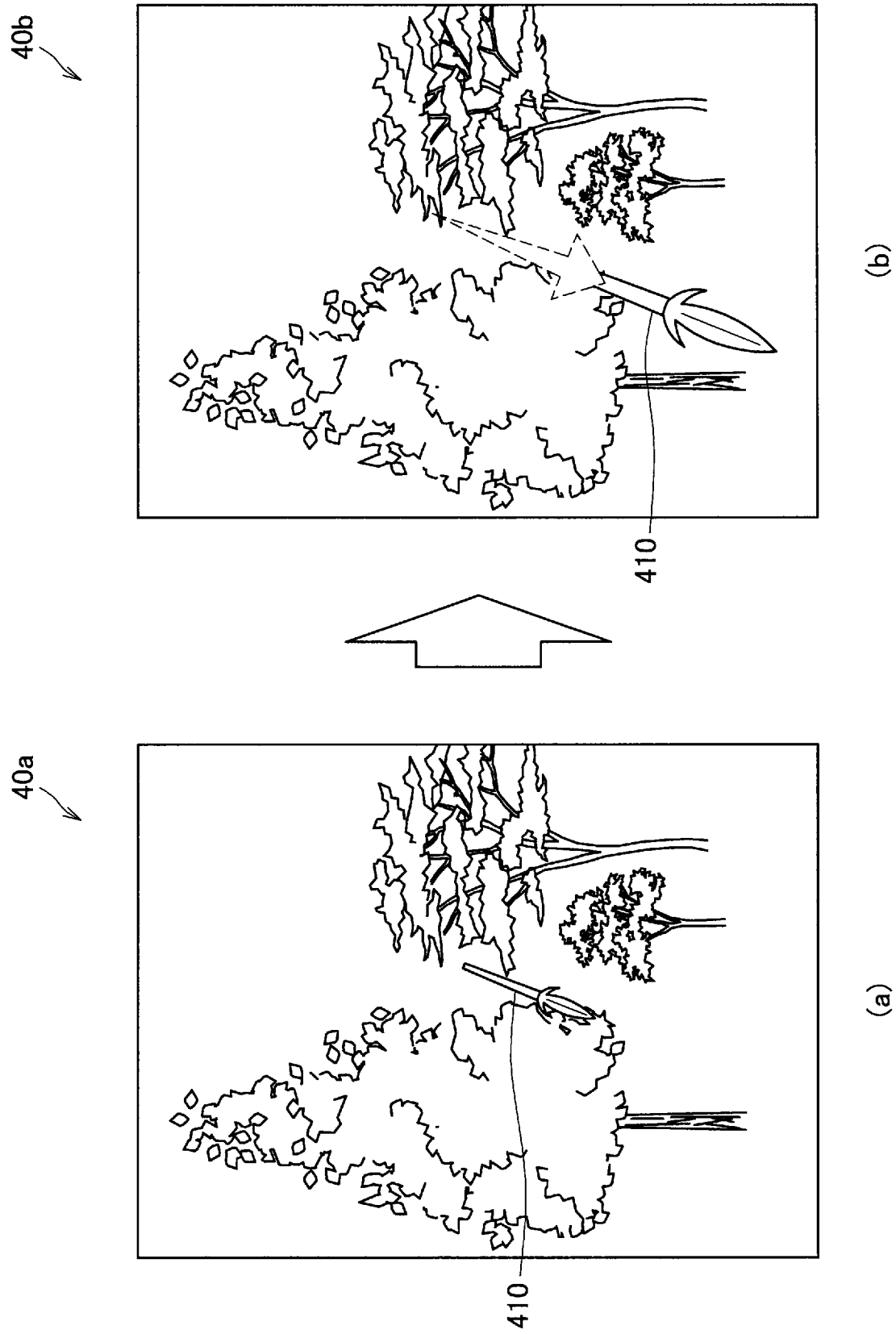
FIG. 23 is a diagram illustrating images 40 displayed in Application Example 2 of the embodiment.
Figure 24:
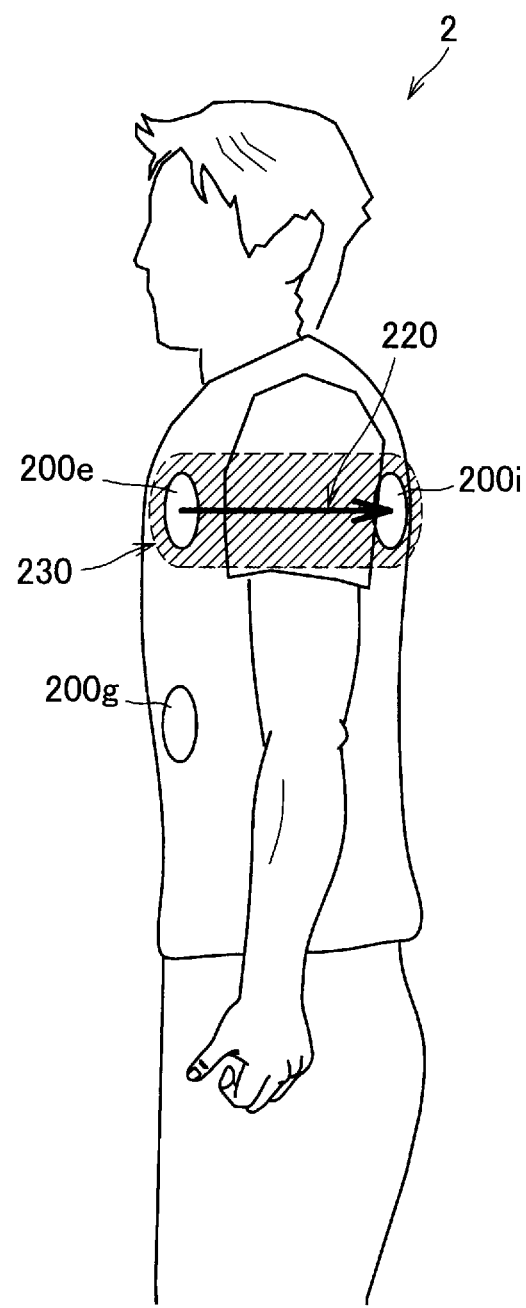
FIG. 24 is a schematic diagram illustrating a movement path of a perceptual position of a tactile stimulus output in Application Example 2.

Next, Application Example 2 of the embodiment will be described with reference to FIGS. 23 to 25. FIG. 23 is a diagram illustrating another example of the images 40 displayed by the display device 30. In the example illustrated in FIG. 23, the images 40 include a spear type object 410. Note that the object 410 is an example of a target region according to the present disclosure.

As illustrated in FIG. 23, an image is assumed to successively transition from the image 40a to the image 40b so that an object 410 is moved to the front left side in the image 40, that is, an animation is displayed as the front tip of a spear is hit on the left side of the body of the user. In this case, as illustrated in FIG. 24, the target position and intensity decision unit 104 first decides a movement path 220 of a target perceptual position on the basis of a movement trajectory of the object 410 in the image 40.

For example, the target position and intensity decision unit 104 first specifies a position (collision position) on the body of the user corresponding to the position of the front tip of the object 410 in the image 40b illustrated in FIG. 23. Note that in the example illustrated in FIG. 25, the collision position is near the contact position of the tactile stimulus unit 200e. Then, the target position and intensity decision unit 104 decides the movement path 220 of the target perceptual position on the basis of the specified position and the movement trajectory of the object 410 in the image 40. Note that in the example illustrated in FIG. 24, the movement path 220 of the target perceptual position is a path connecting a position near the tactile stimulus unit 200e located on the front surface of the left side of the user and a position near a tactile stimulus unit 200i located on the rear surface of the left side of the user. Further, the target position and intensity decision unit 104 decides the range 230 of the target perceptual position.

Subsequently, the output control unit 106 controls output of tactile stimuli to the plurality of tactile stimulus units 200 such as the tactile stimulus unit 200e and the tactile stimulus unit 200i such that the user can perceive successive movement of the range 230 of the target perceptual position along the movement path 220 of the target perceptual position. Thus, a sensation of being pierced by a spear from the front left to the rear left of the user from the collision position serving as a starting point can be presented to the user.

Figure 25:
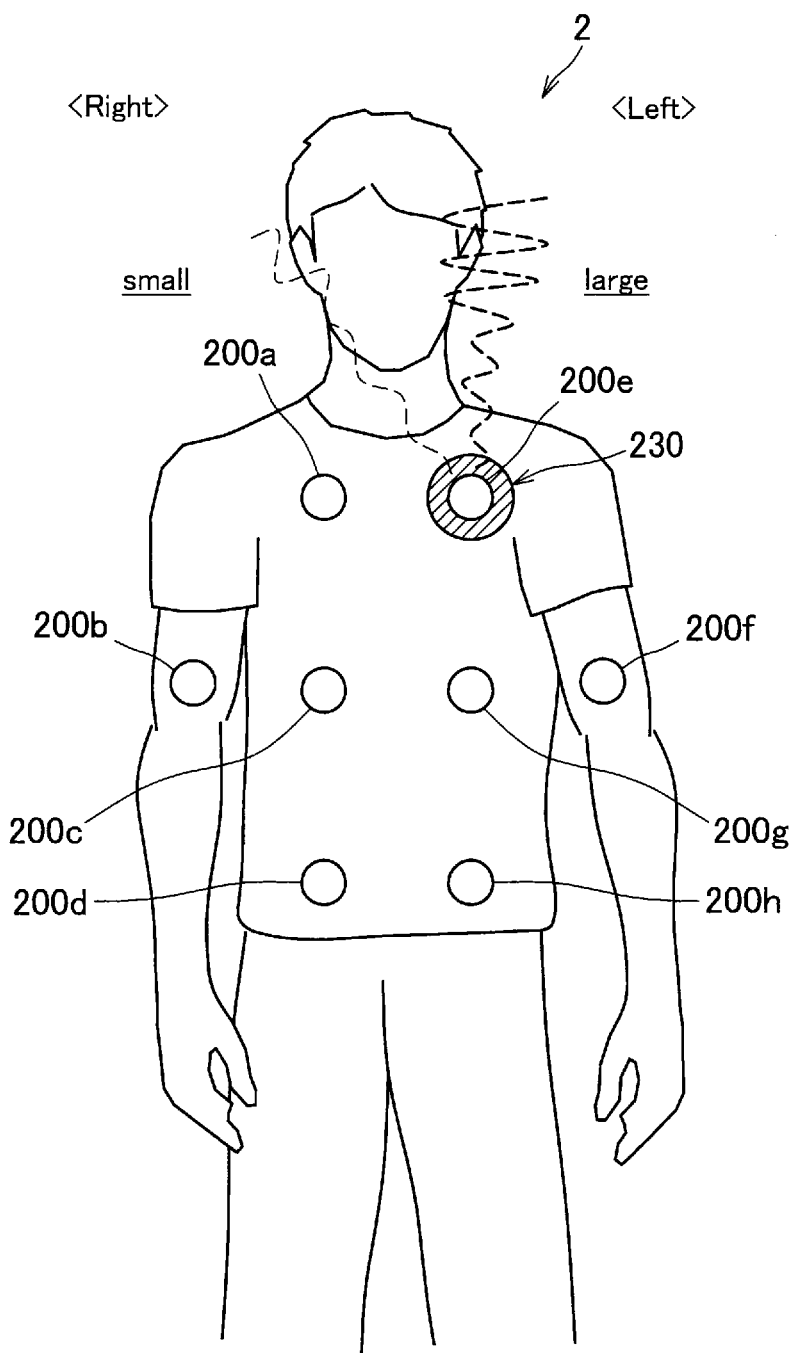
FIG. 25 is a schematic diagram illustrating a tactile stimulus and a sound output to a user in Application Example 2.

Simultaneously, the content reproduction unit 102 causes the two sound output units 202 to output impact sounds as an impact sound is coming from the collision position on the body of the user, as indicated by two dotted-line curves in FIG. 25. For example, since the collision position is located on the left side of the body of the user, as illustrated in FIG. 25, the content reproduction unit 102 causes the sound output unit 202b on the left side of the body of the user to output the impact sound with a larger volume and causes the sound output unit 202a on the right side of the body of the user to output the impact sound with a smaller volume.

According to Application Example 2, the video in which the spear pierces the body of the user can be displayed and a tactile stimulus and an acoustic sound optimum for the video can be simultaneously presented to the user. By presenting a multimodal expression to the user, a higher realistic sensation can be realized.

3-3. Application Example 3

Figure 26:
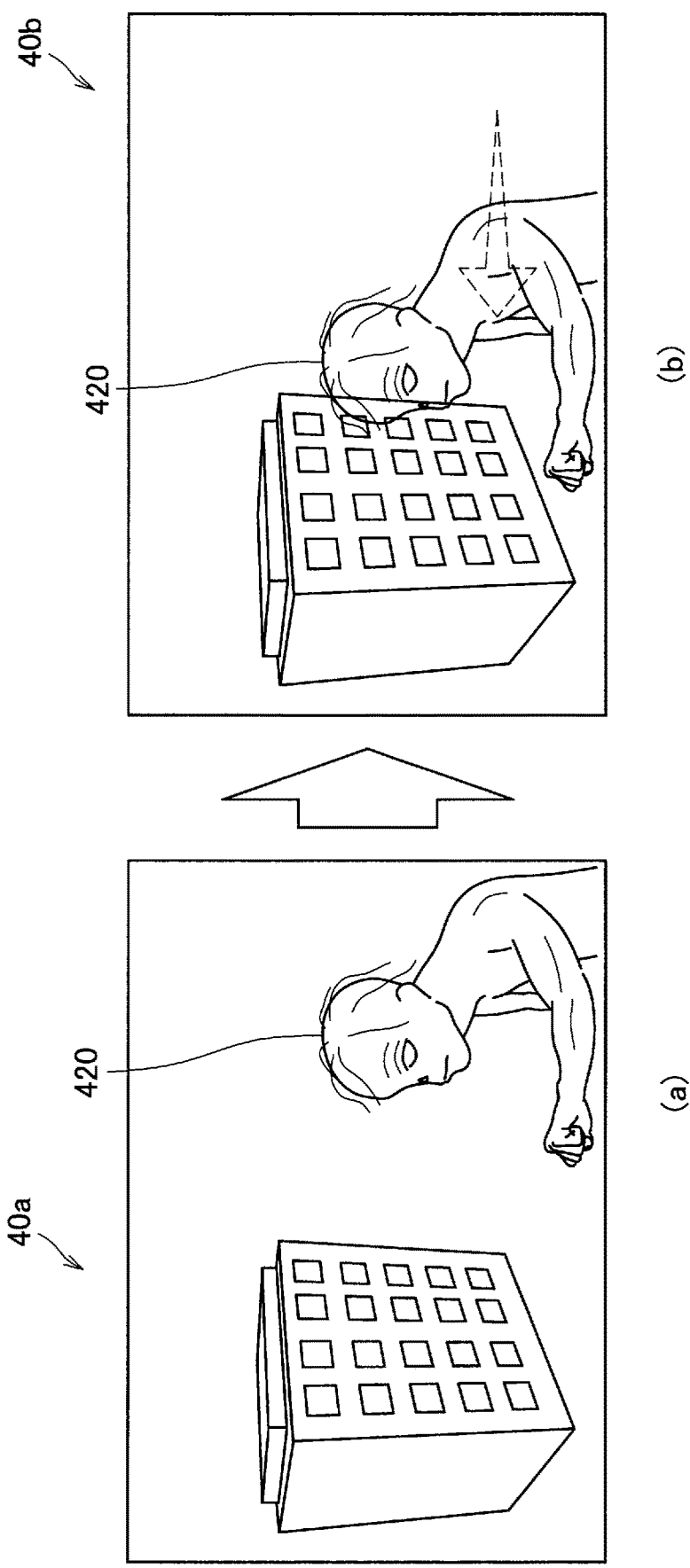
FIG. 26 is a diagram illustrating images 40 displayed in Application Example 3 of the embodiment.

Next, Application Example 3 of the embodiment will be described with reference to FIGS. 26 and 27. FIG. 26 is a diagram illustrating still another example of the images 40 displayed by the display device 30. In the example illustrated in FIG. 26, the images 40 include a monster object 420. Note that the object 420 is an example of a target region according to the present disclosure.

As illustrated in FIG. 26, an image is assumed to successively transition from the image 40a to the image 40b so that an animation is displayed as the object 420 moving from the right side to the left side in the images 40 attacks the user. In this case, as illustrated in FIG. 27, the output control unit 106 first specifies a position (collision position) on the body of the user corresponding to the position of the object 420 (for example, a position of a hand of the object 420 or the like) in the image 40a illustrated in FIG. 26. In the example illustrated in FIG. 27, the collision position is near the contact position of a tactile stimulus unit 200a.

Then, the target position and intensity decision unit 104 decides the movement path 220 of the target perceptual position on the basis of the specified position and the movement trajectory (attack trajectory) of the object 420 in the image 40. Note that in the example illustrated in FIG. 27, the movement path 220 of the target perceptual position is a path connecting the vicinity of the contact position of the tactile stimulus unit 200a located on the right side of the user and the vicinity of the contact position of the tactile stimulus unit 200h located on the left side of the user. Further, the target position and intensity decision unit 104 decides the range 230 of the target perceptual position.

Subsequently, the output control unit 106 controls output of tactile stimuli to the plurality of tactile stimulus units 200 such as the tactile stimulus unit 200a and the tactile stimulus unit 200e such that the user can perceive successive movement of the range 230 of the target perceptual position along the movement path 220 of the target. Thus, a sensation of being attacked by the object 420 from the right side to the left side of the user from the collision position serving as a starting point can be presented to the user.

Figure 27:
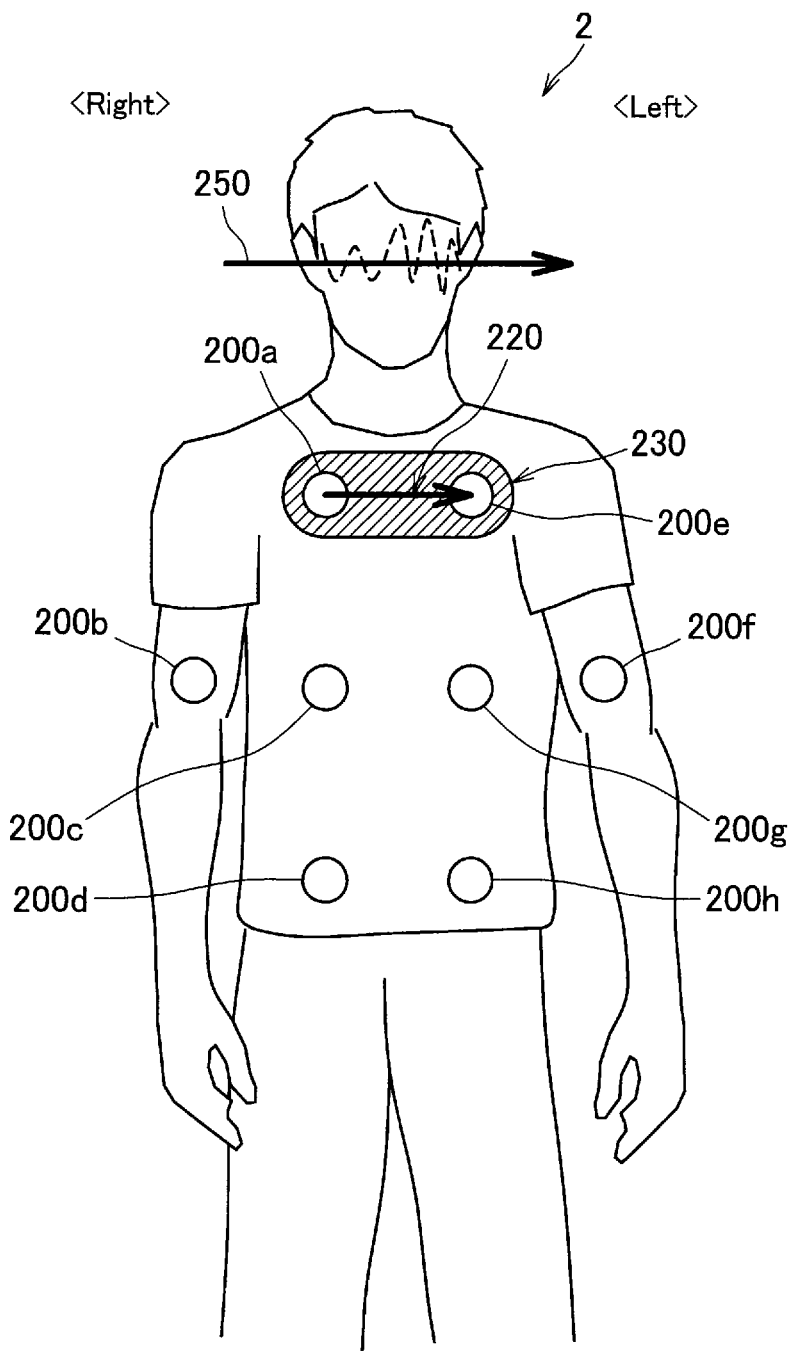
FIG. 27 is a schematic diagram illustrating a tactile stimulus and a sound output to a user in Application Example 3.

Simultaneously, the content reproduction unit 102 causes the two sound output units 202 to output an impact sound so that the impact sound is moved along a movement trajectory 250 of the impact sound and is heard over time, as indicated by a dotted-line curve in FIG. 27. Here, the impact sound can be output in conjunction with the movement of the perceptual position along the movement path 220. For example, the content reproduction unit 102 causes a ratio of a volume of the impact sound caused to be output by the sound output unit 202a on the right side of the body of the user to a volume of the impact sound caused to be output by the sound output unit 202b on the left side of the body of the user to be changed with the movement of the target perceptual position.

According to Application Example 3, the video in which the object 420 attacks the user from the right side to the left side can be displayed and a tactile stimulus and an acoustic sound optimum for the video can be simultaneously presented to the user. By presenting a multimodal expression to the user, a higher realistic sensation can be realized.

4. Hardware Configuration

Figure 28:
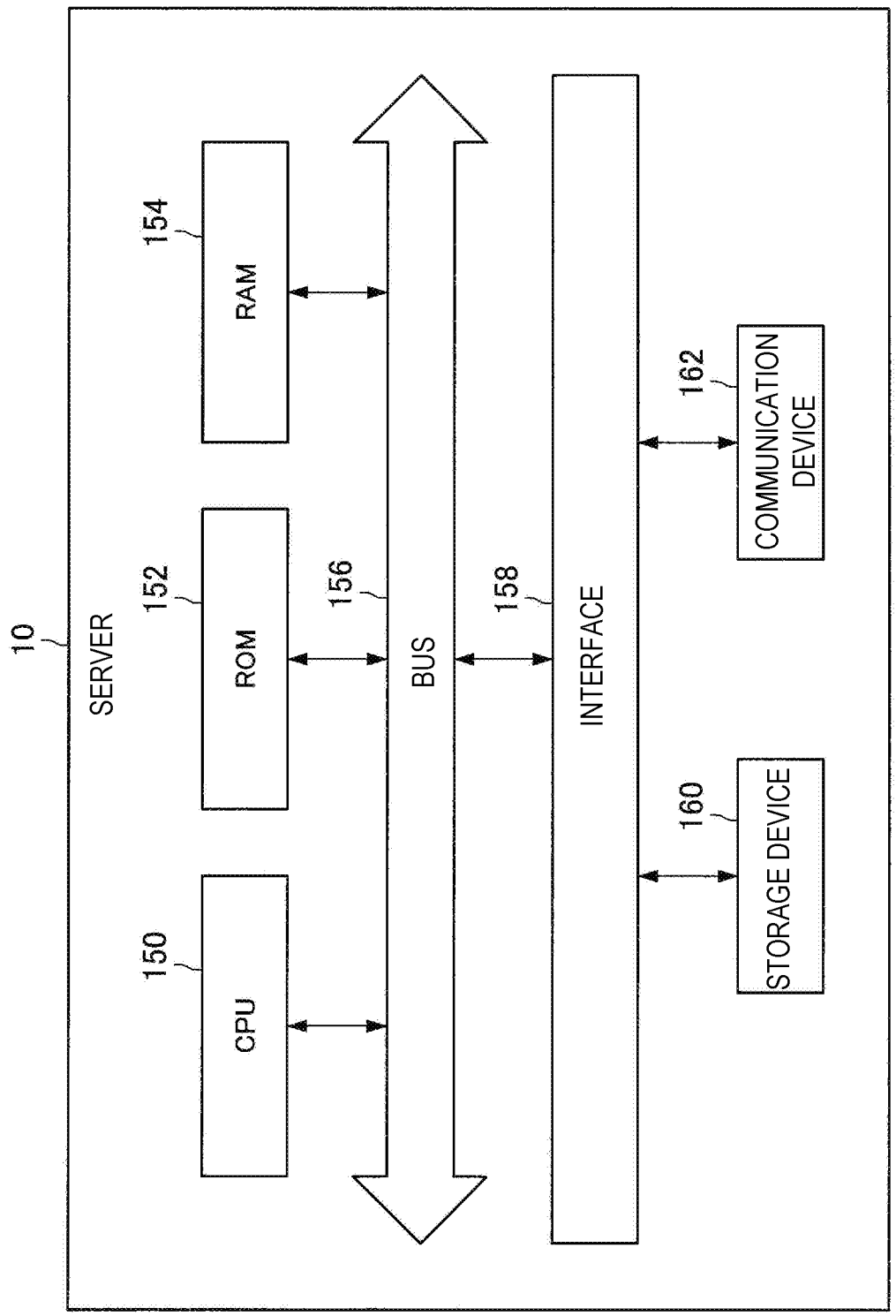
FIG. 28 is an explanatory diagram illustrating a hardware configuration example of the server 10 according to the embodiment.

Next, a hardware configuration of the server 10 according to the present embodiment will be described next with reference to FIG. 28. As illustrated in FIG. 28, the server 10 include a CPU 150, a read only memory (ROM) 152, a RAM 154, a bus 156, an interface 158, a storage device 160 and a communication device 162.

The CPU 150, which functions as an arithmetic processing unit and a control device, controls the whole operation within the server 10 in accordance with various kinds of programs. Further, the CPU 150 implements a function of the control unit 100 at the server 10. Note that the CPU 150 includes a processor such as a microprocessor.

The ROM 152 stores programs, control data such as an operation parameter, or the like, to be used by the CPU 150.

The RAM 154 temporarily stores, for example, programs to be executed by the CPU 150.

The bus 156 includes a CPU bus, or the like. The bus 156 interconnects the CPU 150, the ROM 152 and the RAM 154.

The interface 158 connects the storage device 160 and the communication device 162 to the internal bus 156.

The storage device 160 is a device for data storage, which functions as the storage unit 122. The storage device 160 includes, for example, a storage medium, a recording device which records data in the storage medium, a readout device which reads out data from the storage medium, a deletion device which deletes data recorded in the storage medium, or the like.

The communication device 162 is a communication interface including a communication device, or the like, for connecting to, for example, the communication network 32, or the like. Further, the communication device 162 may be a communication device supporting a wireless LAN, a communication device supporting long term evolution (LTE) or a wired communication device which performs communication in a wired manner. The communication device 162 functions as the communication unit 120.

5. Modification Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

5-1. Modification Example 1

For example, the target perceptual position can be located outside of a presentation range of the tactile stimuli by all the tactile stimulus units 200 in some cases. In addition, in a case in which a distance between the disposition positions of the tactile stimulus units 200 is considerably large, it is difficult to allow the user to perceive tactile stimuli with a target perceptual intensity in a range between the plurality of tactile stimulus units 200 in some cases.

Accordingly, for example, in a case in which the target perceptual position is moved outside of the presentation range of the tactile stimuli by all the tactile stimulus units 200, the server 10 may cause content which is being reproduced to be changed so that a sensation (illusion) of moving the perceptual position outside of the presentation range is given to the user.

As one example, in a case in which target perceptual position is moved in the horizontal direction of the body of the user and is moved outside of the presentation range, the server 10 causes an image which is being displayed (or a specific region inside an image) in the same direction as a movement direction of the target perceptual position (for example, as described in "3. Application Example") to be moved or causes a ratio between volumes caused to be output to the right and left of the body of the user to be changed. Simultaneously, the server 10 sets output intensities of one or more corresponding tactile stimulus units 200 to be the same as output intensities of a case in which the target perceptual position is located in the boundary of the range or weakens the output intensities in accordance with a distance between the target perceptual position and the boundary.

According to this modification example, by using an image or a sound, it is possible to realize (pseudo-) interpolation of the perceptual position outside of the presentation range of the tactile stimulus.

5-2. Modification Example 2

In addition, as another modification example, the server 10 (the output control unit 106) may control the plurality of tactile stimulus units 200 such that the tactile stimuli are sequentially output from the upper side to the lower side or from the lower side to the upper side along the arrangement in the upper and lower directions (the vertical direction) of the plurality of tactile stimulus units 200 on the body of the user. Thus, a gravity sensation, a moving-up sensation, or a moving-down sensation can be presented to the user. For example, the user can expect to obtain a sensation of taking a moving elevator.

5-3. Modification Example 3

In addition, as still another modification example, the server 10 may control output of tactile stimuli to the plurality of tactile stimulus units 200 such that a sensation of pulling the body (for example, a skin or the like) is presented to the user.

5-4. Modification Example 4

In addition, as still another modification example, the server 10 may control output of tactile stimuli in one or more tactile stimulus units 200 and/or the plurality of tactile stimulus units 200 included in the jacket 20 in accordance with a user manipulation (shaking, rotating, or the like) on a predetermined casing including the one or more tactile stimulus units 200. Thus, further, it is possible to realize an improvement in a solution of a spatial or aerial tactile stimulus using another sensitive organ such as a somatic sensation.

5-5. Modification Example 5

In addition, as still another modification example, the example in which the movement of the perceptual position is presented by using the phantom sensation has been described above, but the present disclosure is not limited to the example. For example, the server 10 can also control output of tactile stimuli to the plurality of tactile stimulus units 200 such that an illusion of orienting a perceptual position between the plurality of tactile stimulus units 200 is presented to the user.

As one example, the output control unit 106 may sequentially change output intensities of two tactile stimulus units 200 so that a perceptual position reciprocates between the two tactile stimulus units 200 (in particular, the perceptual position reciprocates near a middle position) at a short period. Alternatively, the output control unit 106 may first change output intensities of two tactile stimulus units 200 so that a perceptual position is moved from the contact position of one of the two tactile stimulus units 200 to the middle position and may then hold (fix) the output intensities of the two tactile stimulus units 200 as the same value after the perceptual position reaches the middle position. Alternatively, when the perceptual position reaches the middle position, the output control unit 106 may set the output intensity of one of the two tactile stimulus units 200 to "0" or a predetermined small value or may gradually decrease the output intensity of the tactile stimulus unit 200. In such a control example, the user can expect to obtain a sensation of orienting the perceptual position in the middle of the two tactile stimulus units 200.

5-6. Modification Example 6

In addition, as still another modification example, an amplitude of a waveform of the output intensity of the tactile stimulus unit 200 (decided on the basis of a waveform of a target perceptual intensity) can be adjusted so that a maximum value of the output intensity (amplitude) is equal to or less than a predetermined value. For example, even when the waveform of the output intensity is multiplied by the adjustment function of the output intensity (as described above), the amplitude of the waveform of the output intensity can be adjusted so that the maximum value of the amplitude is equal to or less than the predetermined value. Note that the amplitude of the waveform of the output intensity may be adjusted in advance or may be adjusted in real time. Alternatively, the values of the parameters of the adjustment function of the output intensity (as described above) may be adjusted so that the maximum value of the amplitude is equal to or less than the predetermined value.

5-7. Modification Example 7

In addition, the perceptual intensity of the tactile stimulus can generally differ depending on a frequency of vibration. For example, human beings can feel vibration most strongly in a case in which a frequency of vibration is about 200 Hz and can feel vibration more weakly when the frequency is higher than 200 Hz. Accordingly, the output control unit 106 may change the frequency of the vibration caused to be generated by the plurality of tactile stimulus units 200 (instead of changing the amplitude) on the basis of the target perceptual position and the target perceptual intensity. Thus, a tactile stimulus of a target perceptual intensity at a target perceptual position can be presented to the user (as in the case in which the amplitude is changed).

5-8. Modification Example 8

In addition, in the above-described embodiment, the examples in which the tactile stimulus units 200 generate vibration as tactile stimuli have been mainly described, but the present disclosure is not limited to these examples. The tactile stimulus units 200 may output temperature, force sense information, electric stimuli, or the like as tactile stimuli. For example, the user 10 can present a target temperature at a position between the plurality of tactile stimulus units 200 by adjusting the temperature of each of the plurality of tactile stimulus units 200 disposed away from the body of the user. In addition, the server 10 can present a target perceptual intensity at the position between the plurality of tactile stimulus units 200 by adjusting strength of the force sense information caused to be output by the plurality of tactile stimulus units 200. In addition, the server 10 can present the target perceptual intensity at the position between the plurality of tactile stimulus units 200 by adjusting strength of electric stimuli caused to be output by the plurality of tactile stimulus units 200.

5-9. Modification Example 9

In addition, in the above-described embodiment, the example in which the positional information according to the present disclosure is the positional information on the body of the user has been mainly described, but the present disclosure is not limited to this example, but the positional information may be spatial positional information. For example, the positional information can be positional information in an actual space. In this case, a target perceptual position (or a region of the target perceptual position, a path of the target perceptual position, or the like) in the actual space can be set. Then, for example, in a case in which it is measured that the user wearing the jacket 20 moves to a location corresponding to the target perceptual position, the server 10 may cause the plurality of tactile stimulus units 200 to generate vibration or may change an output intensity of vibration of each of the plurality of tactile stimulus units 200.

In addition, the positional information can be positional information in a virtual space. In this case, a target perceptual position (or a region of the target perceptual position, a path of the target perceptual position, or the like) in the virtual space can be set. Then, in a case in which it is detected that an object corresponding to the user moves to the target perceptual position in the virtual space, the server 10 may cause the plurality of tactile stimulus units 200 to generate vibration or may change an output intensity of vibration of each of the plurality of tactile stimulus units 200.

5-10. Modification Example 10

In addition, in the above-described embodiment, the example in which the information processing device according to the present disclosure is the server 10 has been described, but the present disclosure is not limited to the example. For example, the information processing device may be a personal computer (PC), a tablet terminal, a portable telephone such as a smartphone, a game device, a portable music player, a mounting device such as an HMD or a wrist type device, or the jacket 20.

In addition, in the above-described embodiment, the example in which the tactile stimulus units according to the present disclosure are included in the jacket 20 has been mainly described, but the present disclosure is not limited to the example. The tactile stimulus units may be included another kind of device. For example, the tactile stimulus units may be included in a write watch type device or a wrist type device or may be included in a chair.

5-11. Modification Example 11

In addition, each step in the operation of each embodiment described above may not necessarily have to be processed in the described sequence. For example, each step may be processed in a suitably changed sequence. In addition, rather than step is processed in chronological sequence, some each of the steps may be processed in parallel or individually. In addition, some of the described steps may be omitted or another step may be further added to the described steps.

In addition, according to the embodiments described above, it is also possible to provide a computer program that causes the hardware of the CPU 150, the ROM 152, the RAM 154, and the like to exhibit the equivalent function as each configuration of the server 10 according to the embodiments described above. A recording medium on which the computer program is recorded is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)
An information processing device including:
an output control unit configured to control output of a tactile stimulus to at least two tactile stimulus units,
in which the output control unit changes the output of the tactile stimulus unit corresponding to predetermined positional information in accordance with the predetermined positional information and information regarding tactile output related to the positional information.

(2)
The information processing device according to (1), in which the output control unit changes an output intensity of the tactile stimulus unit corresponding to the predetermined positional information in accordance with the predetermined positional information and the information regarding the tactile output related to the positional information.

(3)
The information processing device according to (1) or (2), in which the predetermined positional information is positional information on a body of a user.

(4)
The information processing device according to (3), in which the predetermined positional information is changed in accordance with an image displayed in association with output of a tactile stimulus by the tactile stimulus unit.

(5)
The information processing device according to (4), in which the predetermined positional information and the information regarding the tactile output related to the positional information are changed in accordance with a position of a target region in the image.

(6)
The information processing device according to (5), in which the predetermined positional information is moved in a direction that corresponds to a movement direction of the target region in accordance with movement of the target region in the image.

(7)
The information processing device according to any one of (3) to (6), in which the predetermined positional information is changed in accordance with sound information output in association with output of a tactile stimulus by the tactile stimulus unit.

(8)
The information processing device according to (7), in which the predetermined positional information is changed in accordance with a kind or a volume of a sound output to the user.

(9)
The information processing device according to any one of (3) to (8), in which the predetermined positional information is positional information moved along a target path decided on the body.

(10)
The information processing device according to (9), in which the predetermined positional information is moved on the target path over time.

(11)
The information processing device according to (10),
in which the at least two tactile stimulus units include a first tactile stimulus unit and a second tactile stimulus unit, and
the target path is a path connecting a contact position of the first tactile stimulus unit on the body and a contact position of the second tactile stimulus unit on the body.

(12)
The information processing device according to any one of (9) to (11), in which the target path is a path connecting a first position on a first surface on the body, an inside of the body, and a second position on a second surface opposite the first surface.

(13)
The information processing device according to (12),
in which the at least two tactile stimulus units include a first tactile stimulus unit and a second tactile stimulus unit,
the first position is a contact position of the first tactile stimulus unit on the first surface, and
the second position is a contact position of the second tactile stimulus unit on the second surface.

(14)
The information processing device according to (12) or (13),
in which the first surface is a front surface of the user, and
the second surface is a rear surface of the user.

(15)
The information processing device according to any one of (3) to (14), in which the predetermined positional information is changed so that a distance between a third position on the body and a position indicated by the predetermined positional information increases over time.

(16)
The information processing device according to (15), in which the third position is a contact position of one of the at least two tactile stimulus units on the body.

(17)
The information processing device according to any one of (3) to (16),
in which the at least two tactile stimulus units include a first tactile stimulus unit, and
the output control unit changes output of the first tactile stimulus unit on the basis of a distance between a contact position of the first tactile stimulus unit on the body and a position indicated by the predetermined positional information.

(18)
The information processing device according to (17),
in which the at least two tactile stimulus units further include a second tactile stimulus unit, and
the output control unit changes output of the second tactile stimulus unit on the basis of a distance between a contact position of the second tactile stimulus unit on the body and a position indicated by the predetermined positional information.

(19)

An information processing method including:

controlling output of a tactile stimulus to at least two tactile stimulus units; and changing, by a processor, the output of the tactile stimulus unit corresponding to predetermined positional information in accordance with the predetermined positional information and information regarding tactile output related to the positional information.

(20)

A program causing a computer to function as:

an output control unit configured to control output of a tactile stimulus to at least two tactile stimulus units, in which the output control unit changes the output of the tactile stimulus unit corresponding to predetermined positional information in accordance with the predetermined positional information and information regarding tactile output related to the positional information.

REFERENCE SIGNS LIST 10 server
20 jacket
30 display device
32 communication network
100 control unit
102 content reproduction unit
104 target position and intensity decision unit
106 output control unit
120 communication unit
122 storage unit
200 tactile stimulus unit
202 sound output unit

The invention claimed is:

1. An information processing device comprising:
at least one processor configured to
control output of a tactile stimulus to each tactile stimulus unit of at least two tactile stimulus units, and
change the output of each tactile stimulus unit in accordance with predetermined positional information and information regarding tactile output related to the positional information,
wherein the predetermined positional information comprises a position located between the at least two tactile stimulus units,
wherein the at least two tactile stimulus units are respectively configured to be located at a first position on a first surface of a body of a user and a second position on a second surface of the body of the user, and
wherein the first surface of the body of the user is opposite to the second surface of the body of the user with respect to the body of the user.

2. The information processing device according to claim 1, wherein the at least one processor changes an output intensity of each tactile stimulus unit in accordance with the predetermined positional information and the information regarding the tactile output related to the positional information.

3. The information processing device according to claim 1, wherein the predetermined positional information further comprises positional information on the body of the user.

4. The information processing device according to claim 3, wherein the predetermined positional information is changed in accordance with an image displayed in association with the output of the tactile stimulus by each tactile stimulus unit.

5. The information processing device according to claim 4, wherein the predetermined positional information and the information regarding the tactile output related to the positional information are changed in accordance with a position of a target region in the image.

6. The information processing device according to claim 5, wherein the predetermined positional information is moved in a direction that corresponds to a movement direction of the target region in accordance with movement of the target region in the image.

7. The information processing device according to claim 3, wherein the predetermined positional information is changed in accordance with sound information output in association with the output of the tactile stimulus by each tactile stimulus unit.

8. The information processing device according to claim 7, wherein the predetermined positional information is changed in accordance with a volume of a sound output to the user.

9. The information processing device according to claim 3, wherein the predetermined positional information is positional information moved along a target path decided on the body of the user.

10. The information processing device according to claim 9, wherein the predetermined positional information is moved on the target path over time.

11. The information processing device according to claim 10,
wherein the at least two tactile stimulus units include a first tactile stimulus unit and a second tactile stimulus unit, and
the target path is a path connecting a contact position of the first tactile stimulus unit on the body of the user and a contact position of the second tactile stimulus unit on the body of the user.

12. The information processing device according to claim 9, wherein the target path is a path connecting the first position on the first surface of the body of the user and the second position on the second surface of the body of the user opposite the first surface.

13. The information processing device according to claim 12,
wherein the at least two tactile stimulus units include a first tactile stimulus unit and a second tactile stimulus unit,
the first position is a contact position of the first tactile stimulus unit on the first surface, and
the second position is a contact position of the second tactile stimulus unit on the second surface.

14. The information processing device according to claim 12,
wherein the first surface is a front surface of the user, and the second surface is a rear surface of the user.

15. The information processing device according to claim 3, wherein the predetermined positional information is changed so that a distance between a third position on the body of the user and a position indicated by the predetermined positional information increases over time.

16. The information processing device according to claim 15, wherein the third position is a contact position of one of the at least two tactile stimulus units on the body of the user.

17. The information processing device according to claim 3,
wherein the at least two tactile stimulus units include a first tactile stimulus unit, and
the at least one processor changes output of the first tactile stimulus unit on a basis of a distance between a contact position of the first tactile stimulus unit on the body of the user and a position indicated by the predetermined positional information.

18. The information processing device according to claim 17,
wherein the at least two tactile stimulus units further include a second tactile stimulus unit, and
the at least one processor changes output of the second tactile stimulus unit on a basis of a distance between a contact position of the second tactile stimulus unit on the body of the user and a position indicated by the predetermined positional information.

19. An information processing method comprising:
controlling output of a tactile stimulus to each tactile stimulus unit of at least two tactile stimulus units; and
changing, by a processor, the output of each tactile stimulus unit in accordance with predetermined positional information and information regarding tactile output related to the positional information,
wherein the predetermined positional information comprises a position located between the at least two tactile stimulus units,
wherein the at least two tactile stimulus units are respectively configured to be located at a first position on a first surface of a body of a user and a second position on a second surface of the body of the user, and
wherein the first surface of the body of the user is opposite to the second surface of the body of the user with respect to the body of the user.

20. A non-transitory computer-readable storage medium having embodied thereon a program, which when executed by a computer causes the computer to execute a method, the method comprising:
controlling output of a tactile stimulus to each tactile stimulus unit of at least two tactile stimulus units; and
changing the output of each tactile stimulus unit in accordance with predetermined positional information and information regarding tactile output related to the positional information,
wherein the predetermined positional information comprises a position located between the at least two tactile stimulus units,
wherein the at least two tactile stimulus units are respectively configured to be located at a first position on a first surface of a body of a user and a second position on a second surface of the body of the user, and
wherein the first surface of the body of the user is opposite to the second surface of the body of the user with respect to the body of the user.

21. The information processing device according to claim 17,
wherein the at least two tactile stimulus units each include a vibrator.

* * * * *